US006636566B1

(12) United States Patent
Roberts et al.

(10) Patent No.: US 6,636,566 B1
(45) Date of Patent: Oct. 21, 2003

(54) METHOD AND APPARATUS FOR SPECIFYING PULSE CHARACTERISTICS USING A CODE THAT SATISFIES PREDEFINED CRITERIA

(75) Inventors: Mark D. Roberts, Huntsville, AL (US); Marcus H. Pendergrass, Huntsville, AL (US); Larry W. Fullerton, Brownsboro, AL (US); James L. Richards, Fayetteville, TN (US)

(73) Assignee: Time Domain Corporation, Huntsville, AL (US)

( * ) Notice: Subject to any disclaimer, the term of this patent is extended or adjusted under 35 U.S.C. 154(b) by 656 days.

(21) Appl. No.: 09/592,288

(22) Filed: Jun. 12, 2000

(51) Int. Cl.[7] .............................................. H04B 14/06
(52) U.S. Cl. ..................... 375/247; 375/239; 375/242
(58) Field of Search ................................ 375/138, 238, 375/239, 242, 247

(56) References Cited

U.S. PATENT DOCUMENTS

| 5,677,927 A | * | 10/1997 | Fullerton et al. ............ 375/130 |
| 5,687,169 A | * | 11/1997 | Fullerton .................... 370/324 |
| 6,212,230 B1 | * | 4/2001 | Rybicki et al. .............. 375/239 |
| 6,492,904 B2 | * | 12/2002 | Richards ...................... 340/539 |

OTHER PUBLICATIONS

Comments of Pulson Commuications Corporation in the Matter of Amendment of the Commission's Rules to Establish New Personal Communications Services as filed at the Federal Communications Commission on Nov. 9, 1992; GEN. Docket No. 90–314, ET Docket No. 92–100.

* cited by examiner

Primary Examiner—Phoung Phu
(74) Attorney, Agent, or Firm—Venable LLP.; Robert S. Babayi

(57) ABSTRACT

A coding method for a pulse transmission system specifies temporal and/or non-temporal pulse characteristics according to temporal and/or non-temporal characteristic value layouts having one or more allowable and non-allowable regions. The method generates codes having predefined properties. The method generates a pulse train by mapping codes to the characteristic value layouts, where the codes satisfy predefined criteria. In addition, the predefined criteria can limit the number of pulse characteristic values within a non-allowable region. The predefined criteria can be based on relative pulse characteristic values. The predefined criteria can also pertain to spectral properties and to correlation properties. The predefined criteria may pertain to code length and to the number of members of a code family. The pulse train characteristics may pertain to a subset of the pulse train.

36 Claims, 17 Drawing Sheets

FIGURE 1. Characteristic Value Range Layout Parameters

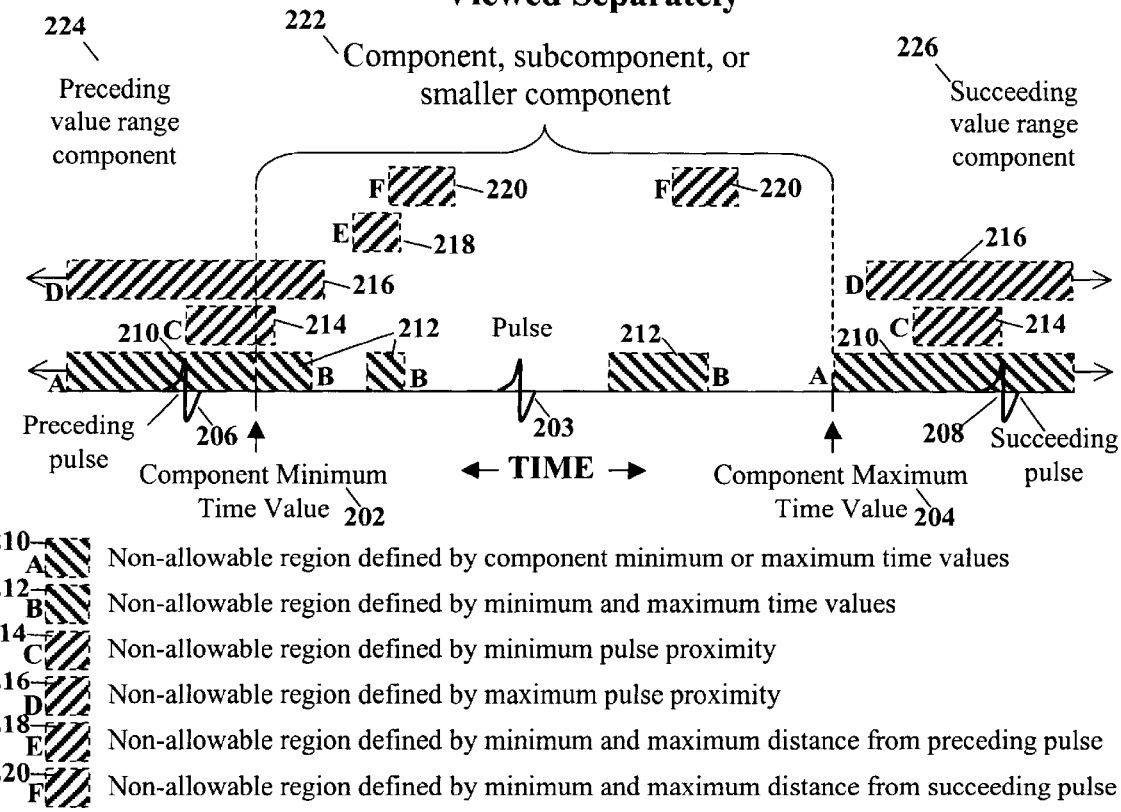
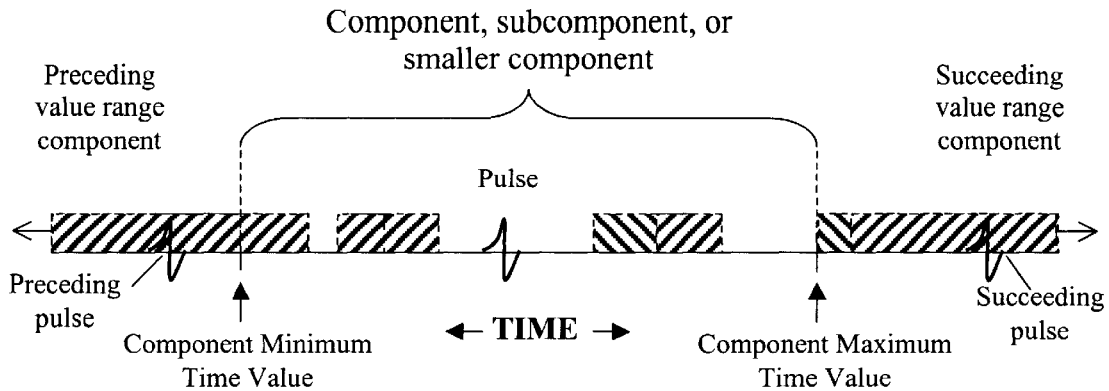
FIGURE 2.

Non-Allowable Regions Within Non-temporal Value Range Layout Viewed Separately

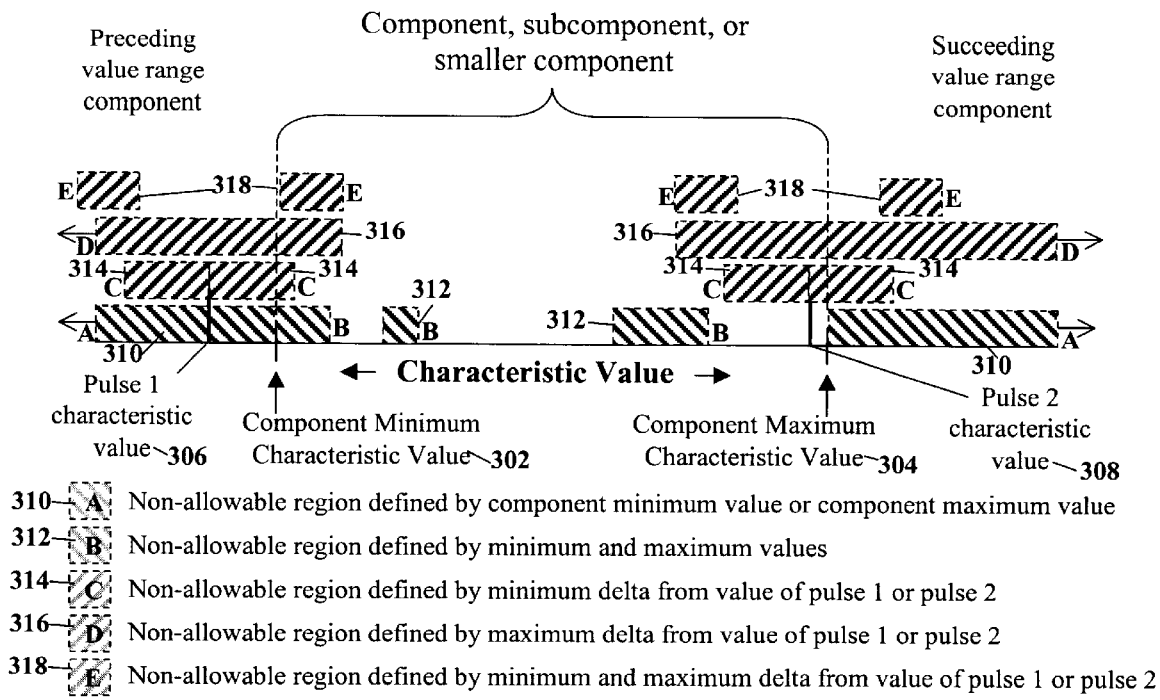

310 — A  Non-allowable region defined by component minimum value or component maximum value
312 — B  Non-allowable region defined by minimum and maximum values
314 — C  Non-allowable region defined by minimum delta from value of pulse 1 or pulse 2
316 — D  Non-allowable region defined by maximum delta from value of pulse 1 or pulse 2
318 — E  Non-allowable region defined by minimum and maximum delta from value of pulse 1 or pulse 2

Non-Allowable Regions Within Non-temporal Value Range Layout Viewed Combined

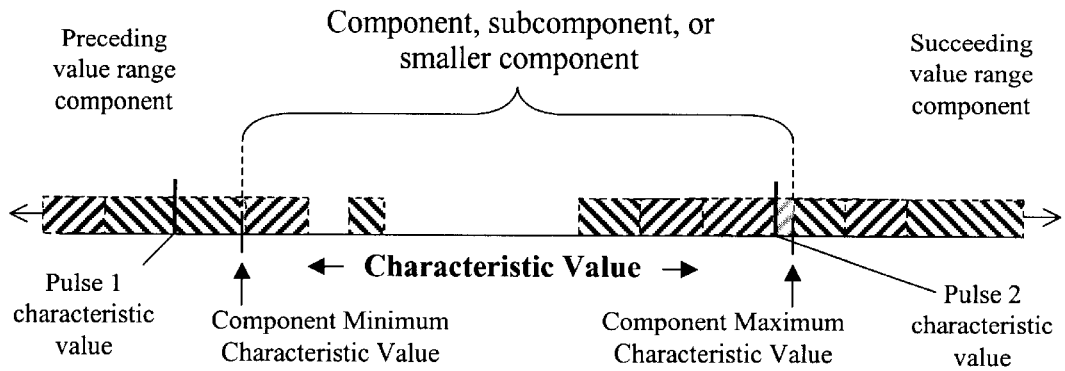

FIGURE 3. Non-allowable Regions

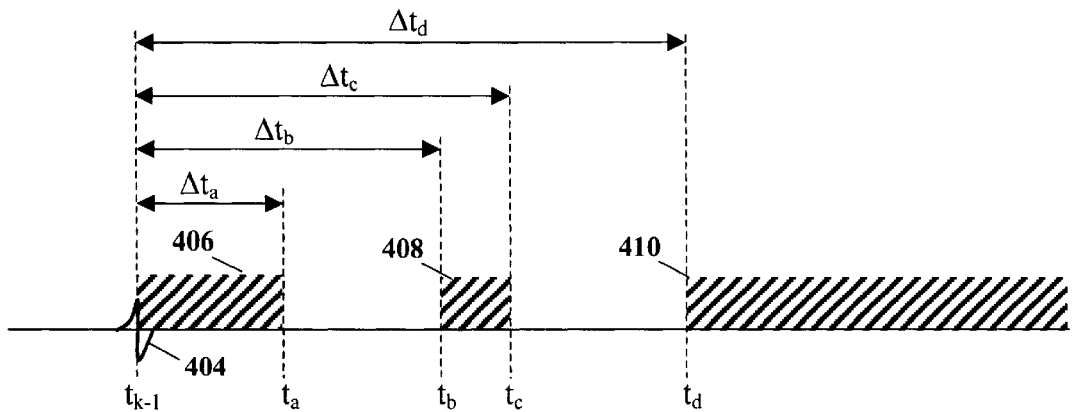
FIGURE 4a. Non-allowable Regions Relative to Preceding Pulse Position
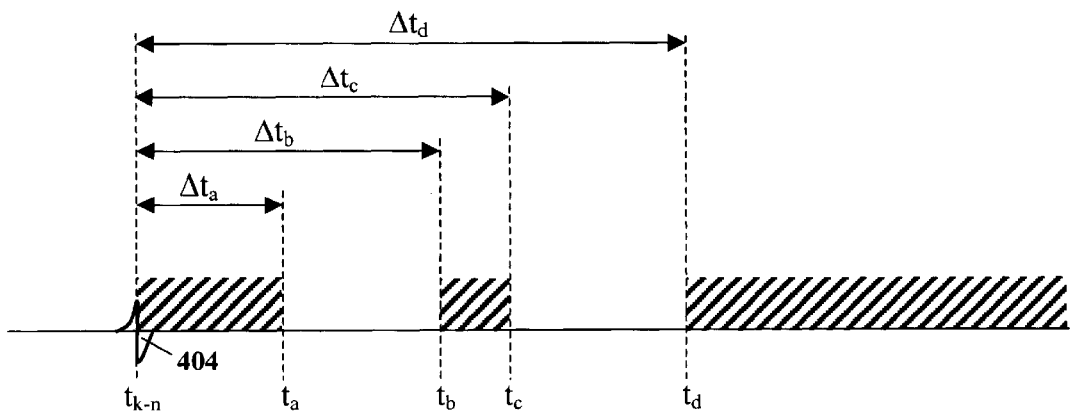
FIGURE 4b. Non-allowable Regions Relative to Any Preceding Pulse Position

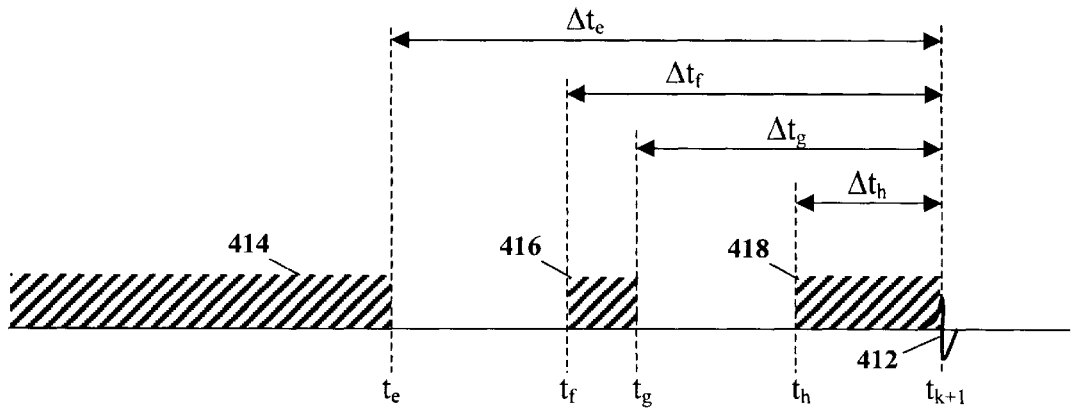
FIGURE 4c. Non-allowable Regions Relative to Succeeding Pulse Position
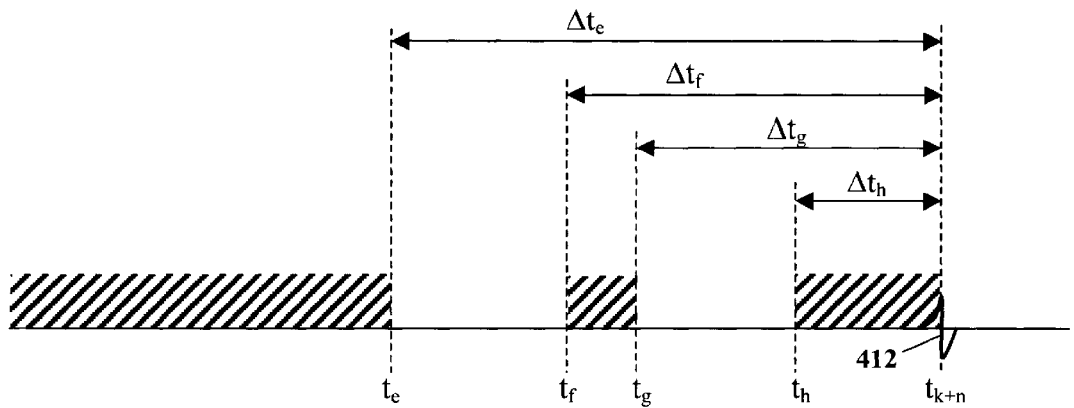
FIGURE 4d. Non-allowable Regions Relative to Any Succeeding Pulse Position

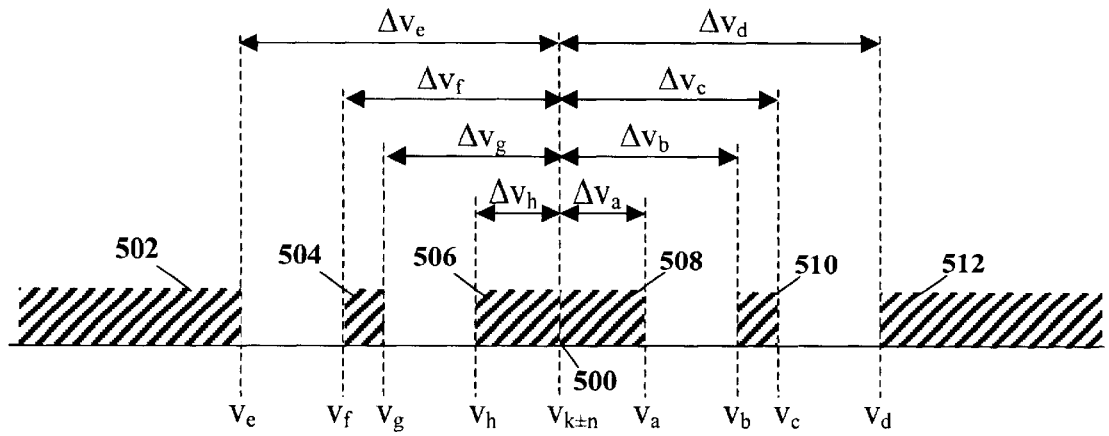

$\Delta v_k \notin [-\infty, -\Delta v_e]$,    $v_k \notin [-\infty, v_e]$    where $v_{k\pm n} - v_e = \Delta v_{max}$ $\Delta v_k \notin [-\Delta v_f, -\Delta v_g]$,    $v_k \notin [v_f, v_g]$ $\Delta v_k \notin [-\Delta v_h, 0]$,    $v_k \notin [v_h, v_{k\pm n}]$    where $v_{k\pm n} - v_h = \Delta v_{min}$ $\Delta v_k \notin [0, \Delta v_a]$,    $v_k \notin [v_{k\pm n}, v_a]$    where $v_a - v_{k\pm n} = \Delta v_{min}$ $\Delta v_k \notin [\Delta v_b, \Delta v_c]$,    $v_k \notin [v_b, v_c]$ $\Delta v_k \notin [\Delta v_d, \infty]$,    $v_k \notin [v_d, \infty]$    where $v_d - v_{k\pm n} = \Delta v_{max}$ FIGURE 5. Non-allowable Regions Relative to Characteristic Value of Any Other Pulse

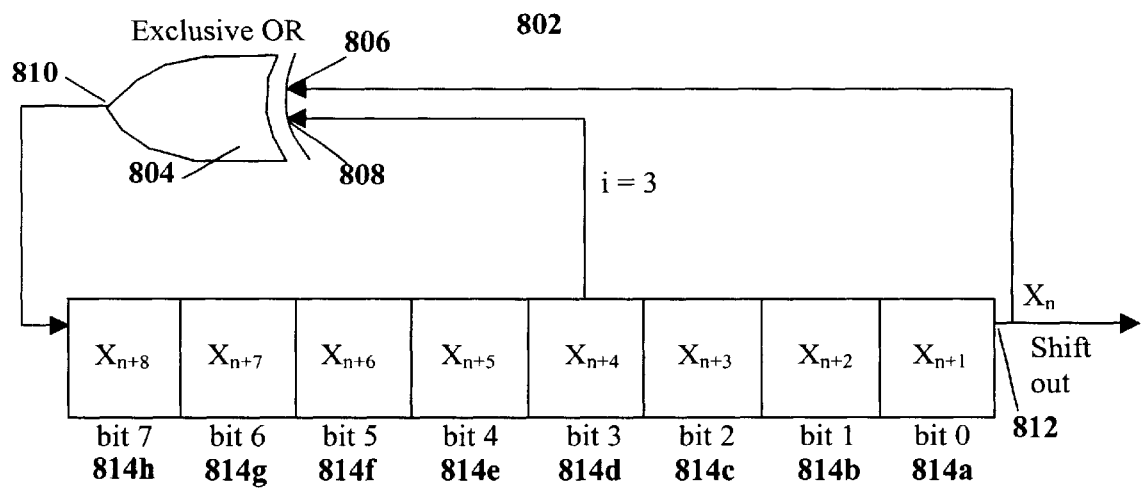
FIGURE 8a. Linear Feedback Shift Register
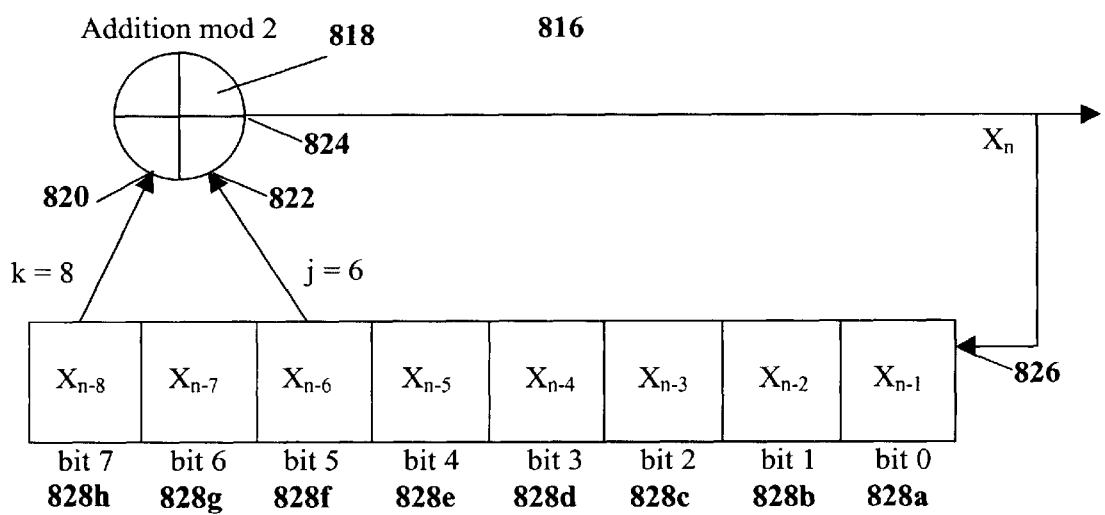
FIGURE 8b. Lagged-Fibonacci Shift Register Generator

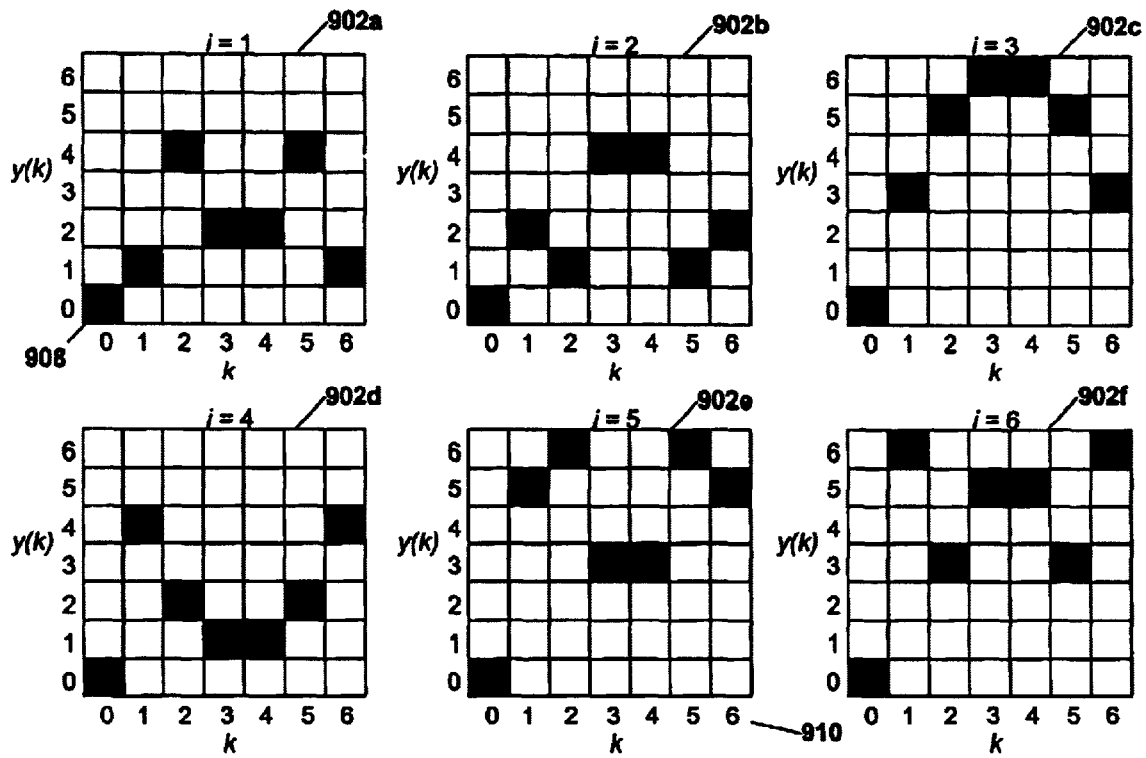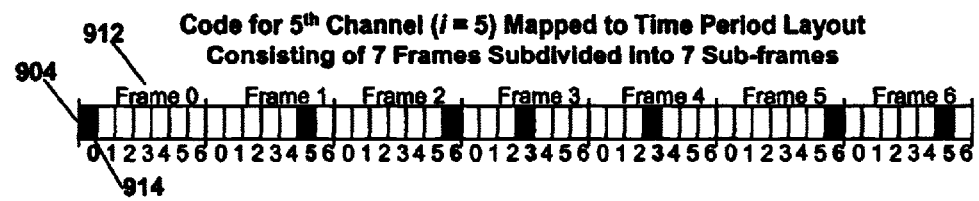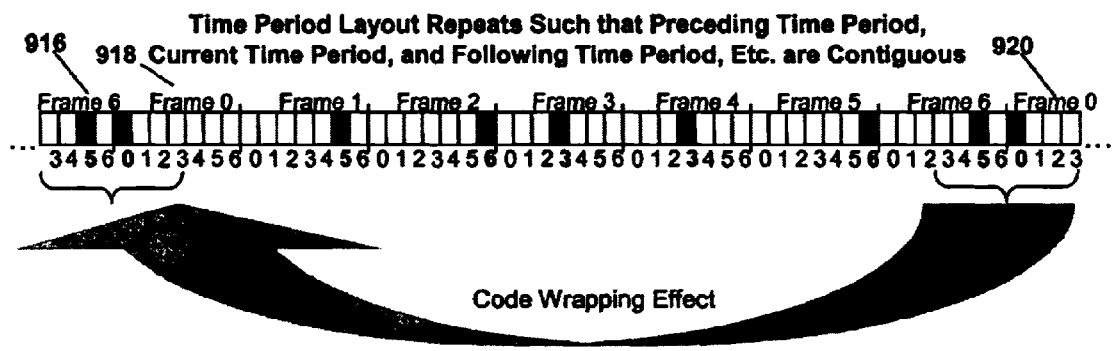
FIGURE 9.

METHOD AND APPARATUS FOR SPECIFYING PULSE CHARACTERISTICS USING A CODE THAT SATISFIES PREDEFINED CRITERIA

TECHNICAL FIELD

The present invention relates to impulse transmission systems and, more particularly, to a method of applying codes for specifying characteristics of pulses in an impulse transmission system.

BACKGROUND OF THE INVENTION

As the availability of communication bandwidth in the increasingly crowded frequency spectrum is becoming a scarce and valuable commodity, Time Modulated Ultra Wideband (TM-UWB) technology provides an excellent alternative for offering significant communication bandwidth, particularly, for various wireless communications applications. Because TM-UWB communication systems are based on communicating extremely short-duration pulses (e.g., pico-seconds in duration), such systems are also known as impulse radio systems. Impulse radio systems were first described in a series of patents, including U.S. Pat. Nos. 4,641,317 (issued Feb. 3, 1987), 4,813,057 (issued Mar. 14, 1989), 4,979,186 (issued Dec. 18, 1990), and 5,363,057 (issued Nov. 8, 1994) to Larry W. Fullerton, and U.S. Pat. Nos. 5,677,927 (issued Oct. 14, 1997), 5,687,169 (issued Nov. 11, 1997), and 5,832,035 (issued Nov. 3, 1998) to Larry W. Fullerton, et al. These patents are incorporated herein by reference.

Multiple access impulse radio systems are radically different from conventional Code Division Multiple Access (CDMA), Time Division Multiple Access (TDMA) and Frequency Division Multiple Access (FDMA) systems. Unlike such systems, which use continuous sinusoidal waveforms for transmitting information, a conventional impulse radio transmitter emits a low power electromagnetic train of short pulses, which are shaped to approach a Gaussian monocycle. As a result, the impulse radio transmitter uses very little power to generate noise-like communication signals for use in multiple-access communications, radar and positioning applications, among other things. In the multi-access communication applications, the impulse radio systems depend, in part, on processing gain to achieve rejection of unwanted signals. Because of the extremely high achievable processing gains, the impulse radio systems are relatively immune to unwanted signals and interference, which limit the performance of systems that use continuous sinusoidal waveforms. The high processing gains of the impulse radio systems also provide much higher dynamic ranges than those commonly achieved by the processing gains of other known spread-spectrum systems.

Impulse radio communication systems transmit and receive the pulses at precisely controlled time intervals, in accordance with a time-hopping code. As such, the time-hopping code defines a communication channel that can be considered as a unidirectional data path for communicating information at high speed. In order to communicate the information over such channels, typical impulse radio transmitters use position modulation, which is a form of time modulation, to position the pulses in time, based on instantaneous samples of a modulating information signal. The modulating information signal may for example be a multi-state information signal, such as a binary signal. Under this arrangement, a modulator varies relative positions of a plurality of pulses on a pulse-by-pulse basis, in accordance with the modulating information signal and a specific time-hopping code that defines the communication channel.

In applications where the modulating information signal is a binary information signal, each binary state may modulate the time position of more than one pulse to generate a modulated, coded timing signal that comprises a train of identically shaped pulses that represent a single data bit. The impulse transmitter applies the generated pulses to a specified transmission medium, via a coupler, such as an antenna, which electromagnetically radiates the pulses for reception by an impulse radio receiver. The impulse radio receiver typically includes a single direct conversion stage. Using a correlator, the conversion stage coherently converts the received pulses to a baseband signal, based on a priori knowledge of the time-hopping code. Because of the correlation properties of the selected time-hopping codes, the correlator integrates the desired received pulses coherently, while the undesired noise signals are integrated non-coherently such that by comparing the coherent and non-coherent integration results, the impulse receiver can recover the communicated information.

Conventional spread-spectrum code division multiple access (SS-CDMA) techniques accommodate multiple users by permitting them to use the same frequency bandwidth at the same time. Direct sequence CDMA systems employ pseudo-noise (PN) codewords generated at a transmitter to "spread" the bandwidth occupied by transmitted data beyond the minimum required by the data. The conventional SS-CDMA systems employ a family of orthogonal or quasi-orthogonal spreading codes, with a pilot spreading code sequence synchronized to the family of codes. Each user is assigned one of the spreading codes as a spreading function. One such spread-spectrum system is described in U.S. Pat. No. 4,901,307 entitled SPREAD-SPECTRUM MULTIPLE ACCESS COMMUNICATIONS SYSTEM USING SATELLITE OR TERRESTRIAL REPEATERS by Gilhousen et al.

Unlike direct sequence spread-spectrum systems, the time-hopping code for impulse radio communications is not necessary for energy spreading, because the monocycle pulses themselves have an inherently wide bandwidth. Instead, the impulse radio systems use the time-hoping codes for channelization, energy smoothing in the frequency domain, and interference suppression. The time-hoping code defines a relative position of each pulse within a group of pulses, or pulse train, such that the combination of pulse positions defines the communications channel. In order to convey information on such communication channel, each state of a multi-state information signal varies a relative pulse position by a predefined time shift such that a modulated, coded timing signal is generated comprising a train of pulses, each with timing corresponding to the combination of the time position coding and the multi-state modulation.

In one conventional binary approach, pulses are time-modulated forward or backward about a nominal position. More specifically, each pulse is time modulated by adjusting its position within a time frame to one of two or more possible times. For example, in order to send a "0" binary bit during the time frame, the pulse may be offset from a nominal position of the time frame by about −50 pico-seconds. For a "1" binary state, the pulse may be offset from the nominal position by about +50 pico-seconds. Conventional coders that generate the time-hoping code do so in response to a periodic timing signal that corresponds to the data-rate of the multi-state information signal. The data rate of the impulse radio transmission may for example be a fraction of a periodic timing signal that is used as a time base or time reference.

In practice, decoding errors are minimized using distinctive time-hopping codes with suitable autocorrelation and cross-correlation properties. The cross-correlation between any two time-hopping codes should be low for minimal interference between multiple users in a communications system or between multiple target reflections in radar and positioning applications. At the same time, the autocorrelation property of a time-hoping code should be steeply peaked, with small side-lobes. Maximally peaked time-hopping code autocorrelation yields optimal acquisition and synchronization properties for communications, radar and positioning applications.

Various coding schemes with known correlation characteristics are available. For example, algebraic codes, Quadratic Congruential (QC) codes, Hyperbolic Congruential (HC) codes and optical codes have been suggested in the past for coding in impulse radio systems. Generally, based on known assumptions, the coding schemes guarantee a maximum number of pulse coincidences, i.e., hits, for any defined time frame or time frame shift during which the codes are repeated. For example, HC codes are guaranteed a maximum of two hits for any sub-frame or frame shift.

McCorkle in U.S. Pat. No. 5,847,677 discloses a random number generator for generating a pseudo-random code for use with jittered pulse repetition interval radar systems. The code is generated by a random number generator that possesses certain attributes desirable for a jittered radar. As disclosed, the attributes related to a flat frequency spectrum, a nearly perfect spike for an autocorrelation function, a controllable absolute minimum and maximum interval, long sequences that do not repeat, and a reasonable average pulse rate.

One known coding technique for an impulse radio is disclosed by Barrett in U.S. Pat. No. 5,610,907, entitled "Ultrafast Time Hopping CDMA-RF Communications: Code-As-Carrier, Multichannel Operation, High data Rate Operation and Data Rate on Demand." According to the disclosed techniques, two levels of coding are used: major orthogonal codes are applied to provide multiple channels, and forward error correction (FEC) codes are applied to information data before transmission. The disclosed system relies on dividing time into repetitive super-frames, frames and sub-frames. As disclosed, a super-frame corresponds to a time interval of about 1 millisecond, representing one repetition of a code pattern, where as a frame is defined as a time interval of about 1 microsecond divided according to a code length. A sub-frame corresponds to a short time interval of about 1 nano second during which a pulse is time positioned.

Because of practical limitations associated with arbitrarily positioning of pulses in adjacent frames, each frame may have to be divided into allowable and non-allowable time regions for positioning a pulse. One such limitation is associated with hardware limitation on minimum pulse-to-pulse time for respective positioning of two pulses on adjacent frames arbitrarily. The system disclosed in Barrett uses a fraction of frame time for encoding and designates the remainder as a RESET period. The inventors have found that the presence of the RESET period affects the correlation properties of the codes used in Barrett, specifically, that the maximum correlation guarantee may no longer hold true. With the correlation property guarantee; of such codes in question the applicability of such codes to a given application is also questionable.

TM-UWB technology is applicable to a wide variety of applications including communications, radar, and positioning, etc. Codes must be produced to specify temporal and non-temporal pulse characteristics of pulse trains having appropriate correlation properties and spectral properties, and which meet various other requirements of these applications. Therefore, there exists a need for code mapping that produces desired pulse train characteristics.

SUMMARY OF THE INVENTION

Briefly, according to the present invention, a coding method for a pulse transmission system specifies temporal and/or non-temporal pulse characteristics according to at least one characteristic value layout that may include one or more non-allowable regions. Codes having predefined properties are generated. A pulse train is generated by mapping a code to the at least one temporal and/or non-temporal pulse characteristic layout, where the code or a subset of the code satisfies predefined criteria.

In one exemplary embodiment of the invention, a non-allowable region may be relative to one or more values within a characteristic value layout. In another exemplary embodiment of the invention, a non-allowable region may be relative to a temporal or non-temporal characteristic value of one or more pulses. According to some of the more detailed features of the invention, predefined criteria may limit the number of pulse characteristic values within a non-allowable region.

Predefined criteria may pertain to a spectral property of the pulse train produced when employing a code. In one embodiment of the invention, predefined criteria may limit the maximum or average spectral density within some bandwidth of interest.

Predefined criteria may pertain to a correlation property of a code. In one embodiment of the invention, predefined criteria may limit the maximum or average number of autocorrelation coincidences for some time offset. In another embodiment of the invention, predefined criteria may limit the maximum or average number of cross-correlation coincidences.

Predefined criteria may pertain to code length. In one embodiment of the invention, predefined criteria may require a code to have a length that is not less than some minimum length and/or greater than some maximum length.

Predefined criteria may also pertain to the number of members of a code family. In zone embodiment of the invention, a code family must have at least some minimum number of members.

BRIEF DESCRIPTION OF DRAWINGS

FIG. 2 illustrates a temporal pulse characteristic value range layout including a pulse and a preceding and succeeding pulse relative to the pulse and having multiple non-allowable regions.

FIG. 3 illustrates a non-temporal pulse characteristic value range layout including characteristic values of two other pulses and having multiple non-allowable regions.

FIG. 4a illustrates non-allowable regions relative to a preceding pulse position within a temporal pulse characteristic delta value range layout.

FIG. 4b illustrates non-allowable regions relative to a succeeding pulse position within a temporal pulse characteristic delta value range layout.

FIG. 4c illustrates non-allowable regions relative to any preceding pulse position within a temporal pulse characteristic delta value range layout.

FIG. 4d illustrates non-allowable regions relative to any succeeding pulse position within a temporal pulse characteristic delta value range layout.

FIG. 5 illustrates non-allowable regions relative to any pulse characteristic value in a non-temporal pulse characteristic delta value range layout.

FIG. 8a is a diagram of a binary linear feedback shift-register pseudorandom number generator.

FIG. 8b is a diagram of an additive Lagged-Fibonacci shift register pseudorandom number generator.

FIG. 9 depicts generation of a family of quadratic congruential codes comprising 6 channels, mapping of the $5^{th}$ channel code to a time layout, and the code wrapping effect that occurs due to the code repeating over time.

DETAILED DESCRIPTION

The present invention provides a coding method for a pulse transmission system that ensures pulse train characteristics meet predefined criteria. The method specifies temporal and/or non-temporal pulse characteristics according to temporal and/or non-temporal characteristic value layouts that may include one or more non-allowable regions. The method generates codes having predefined properties. The method generates a pulse train by mapping codes to characteristic value layouts, where the codes or subsets of codes satisfy predefined criteria. In addition, the predefined criteria can limit the number of pulse characteristic values within a non-allowable region. The predefined criteria can be based on relative pulse characteristic values. The predefined criteria can also pertain to spectral properties and to correlation properties. The predefined criteria can also pertain to code length and to the number of members of a code family.

I. Pulse Characteristic Layouts

To facilitate mapping of codes to pulse characteristics, layouts of pulse characteristic values can be defined, where a pulse characteristic may be time position, pulse amplitude, pulse width (in time), pulse polarity, or pulse type. Such layouts can be defined in a multitude of ways to accommodate a wide variety of pulse transmission system applications. One way to characterize a layout is by specifying a range of pulse characteristic values. Another way to characterize a layout requires specifying discrete pulse characteristic values.

A. Value Range Layout

One exemplary embodiment involves a pulse characteristic value range layout where various pulse characteristic values over some range are divided into smaller and smaller components to achieve a desired component resolution in order to facilitate mapping of a code element value to a characteristic value that resides within a layout component, which corresponds to some range of values. The below described exemplary embodiment performs this component-based pulse characteristic value range layout using any of various temporal or non-temporal pulse characteristics such as, e.g., pulse time position, pulse width, pulse amplitude, pulse polarity, etc.

Figure 1:
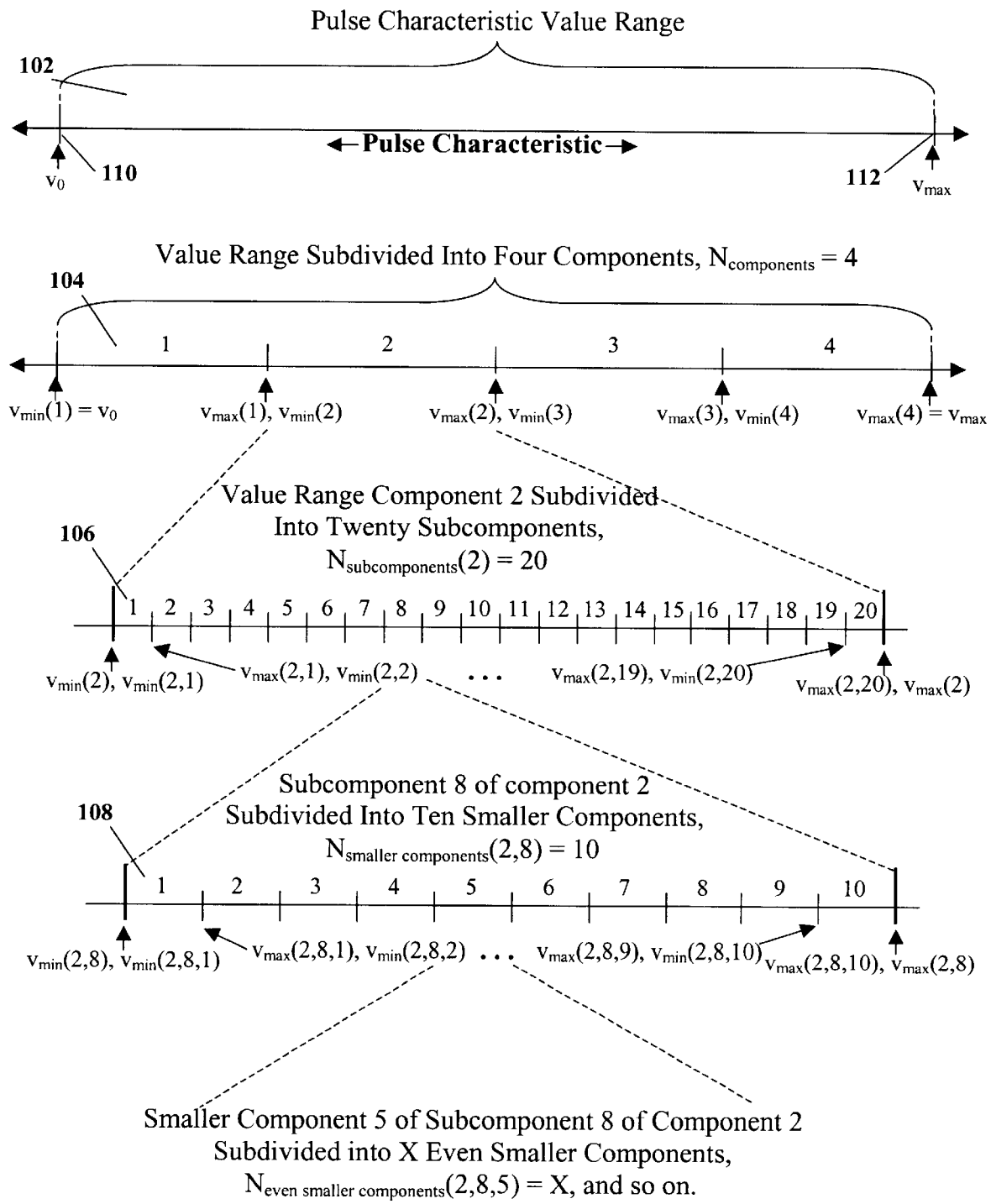
FIG. 1 illustrates a generic pulse characteristic value range layout including exemplary layout parameters, and exemplary subdivisions of the value range including components, subcomponents, smaller components, and even smaller components.

FIG. 1 illustrates an exemplary value range layout which can represent a temporal, non-temporal, or combination of the two, pulse characteristic such as, e.g., timing of a pulse, and amplitude. FIG. 1 includes a value range layout 102. The pulse can take on characteristic values between a minimum value $v_0$ 110 and a maximum value $v_{max}$ 112 in layout 102. Layout 102, as shown, can be subdivided into components 104. Components 104 can in turn be divided into sub-components 106. Sub-components 106 can in turn be divided into smaller components 108. Smaller components 108 can then be divided into even smaller components, as shown. The process of subdividing components can be repeated, ad infinitum, so that smaller and smaller components can be obtained.

The process of subdividing a layout into components is now described in detail. In particular, FIG. 1 depicts an exemplary embodiment of pulse characteristic value range layout parameters. Specifically, a pulse characteristic value range 102 is shown. As depicted in FIG. 1, two layout parameters, $v_0$ and $v_{max}$, can be specified to define a pulse characteristic value range 102 bounded by a minimum value of $v_0$ and a maximum value of $v_{max}$. A second layout parameter, $N_{components}$, can be specified to divide the value range 102 into one or more components 104 of the same size, or of different sizes, with each component 104 (indexed by the letter-n) having a minimum value, $v_{min}(n)$, and a maximum value, $v_{max}(n)$, where n=1 to $N_{components}$.

The number and size of components 104 used in a given layout can be selected for various reasons. For example, the number and size of components 104 can be tailored to meet, e.g., specific application requirements, to remain within system implementation limits, to achieve one or more of a variety of system characteristics in areas such as, e.g., performance (i.e., bit rate), reliability (i.e., bit error rate), system-simplicity, ease-of-use, inter alia. When different sized components 104 are employed, minimum and maximum values can be specified for each component 104 indexed by n, wherein the minimum value for a given component, $v_{min}(n)$, equals the maximum value of the preceding component, $v_{max}(n-1)$, or $v_0$, and the maximum value of a given component, $v_{max}(n)$, equals the minimum value for the following component, $v_{min}(n+1)$, or $v_{max}$. When same sized components 104 are employed, the value range is evenly divided such that $v_{max}(n)-v_{min}(n)$ is equal for each component 104 indexed by n.

An array of layout parameters, $N_{sub-components}$ ($N_{components}$), can be specified to subdivide each component 104 into sub-components 106 of the same size, or different sizes, with each sub-component 106 (indexed by m) of the component 104 (indexed by n) having a minimum value, $v_{min}(n,m)$, and a maximum value, $v_{max}(n,m)$, where n=1 to $N_{components}$ and m=1 to $N_{sub-components}(n)$. As with components 104, the number and size of sub-components 106 for a given component 104 used in a given value range layout 102 can also be tailored to meet, e.g., specific application requirements, to remain within system implementation limits, to achieve one or more of a variety of system characteristics in areas such as, e.g., performance (i.e., bit rate), reliability (i.e., bit error rate), system-simplicity, ease-of-use, etc., and/or for many other reasons. When different sized sub-components 106 are employed, minimum and maximum values are specified for each sub-component 106 indexed by m of each component 104 indexed by n, wherein the minimum value for a given sub-component, $v_{min}(n,m)$, equals the maximum value of the preceding sub-component, $v_{max}(n,m-1)$, or the minimum value of the component in which the sub-component resides, $v_{min}(n)$, and the maximum value of a given sub-component, $v_{max}(n,m)$, equals the minimum value for the following sub-component, $v_{min}(n, m+1)$, or the maximum value of the component in which the sub-component resides, $v_{max}(n)$. When same sized sub-components 106 are employed, components are evenly divided such that $v_{max}(n,m)-v_{min}(n,m)$ is equal for each sub-component 106 indexed by m of a component 104 indexed by n or for all components such that all sub-components 106 of a given component 104 are of the same size, wherein sub-component sizes may vary from component to component or all sub-components of all components are of the same size depending on the sizes of the components and the numbers of sub-components in the components.

In a manner consistent with the subdivision of components into sub-components, additional multi-dimensional arrays of layout parameters can be used to further subdivide sub-components 106 into smaller components 108 (as shown) of the same or different sizes, ad infinitum, until a smallest desirable component resolution is attained, with components at each resolution level having a minimum value, $v_{min}(n,m, \ldots, a)$, and a maximum value, $v_{max}(n,m, \ldots, a)$, where n=1 to $N_{components}$, m=1 to $N_{sub-components}(n), \ldots$, and a=1 to $N_{smallest\ components}(n, m, \ldots)$. Such further subdivision of sub-components into smaller and smaller components enables systems with finer and finer tuning resolution and thus higher and higher fidelity, increases modulation accuracy, and can be useful for other purposes. As with components 104 and sub-components 106, the number and size of these smaller components 108 can also be tailored, e.g., to meet specific application requirements, to remain within system implementation limits, to achieve one or more of a variety of system characteristics in areas such as performance (i.e., bit rate), reliability (i.e., bit error rate), system-simplicity, ease-of-use, etc., and/or for many other reasons. When different sizes of these smaller components 108 are employed, minimum and maximum values are specified for each smaller component 108 (indexed by a), wherein the minimum value for a component, $v_{min}(n,m, \ldots, a)$, equals the maximum value of the preceding component, $v_{max}(n,m, \ldots, a-1)$, or the minimum value of the next highest component in which the component resides, $v_{min}(n,m, \ldots)$, and the maximum value of a given component, $v_{max}(n,m, \ldots, a)$, equals the minimum value for the following component, $v_{min}(n,m, \ldots, a+1)$, or the maximum value of the next higher level component in which the component resides, $v_{max}(n,m, \ldots)$. When same sized smaller components 108 are employed, the next higher level components 106 are evenly divided such that $v_{max}(n,m, \ldots, a)-v_{min}(n,m, \ldots, a)$ is equal for each smaller component 108 indexed by a of a given next higher level component or for all next higher level components such that all components of a given next higher level component are of the same size, wherein component sizes may vary from next higher level component to next higher level component or all components of all higher level components are of the same size depending on the sizes of the next higher level components and the numbers of components in the next higher level components.

At the top of FIG. 1, pulse characteristic value range 102 is depicted that is bounded by endpoints of $v_0$ and $v_{max}$. Beneath this illustration an equivalent value range 102 is shown that has been subdivided into four components 104 by setting the layout parameter $N_{components}$ to a value of four (4), and the size of each component has been established by setting the minimum and maximum values of each component, $v_{min}(n)$ and $v_{max}(n)$, where n=1 to 4. An enlargement of the second component 104 is then shown where the component has been subdivided into twenty sub-components 106 by setting the layout parameter $N_{sub-components}(2)$ to a value of twenty (20), and the size of each sub-component 106 has been established by setting the minimum and maximum values of the sub-components 106 within component two 104, $v_{min}(n,m)$ and $v_{max}(n,m)$, where n=2 and m=1 to 20. As illustrated, there are 20 sub-components 106 in component 104, indexed by n=2, and m=1–20, labeled $v_{min}(2,1)$ and $v_{max}(2,20)$.

An enlargement of the eighth sub-component 106 of component two 104 is then shown where the sub-component 106 has been subdivided into ten smaller components 108 by setting the layout parameter $N_{smaller\_components}(2,8)$ to a value of ten (10), and the size of each smaller component 108 has been established by setting the minimum and maximum values of the smaller components within sub-component eight 106 of component two 104, $v_{min}(n,m,l)$ and $v_{max}(n,m,l)$, where n=2, m=8, and l=1 to 10. As illustrated, there are 10 smaller components 108 in sub-component 106, indexed by n=2, m=8, and l=1 to 10, labeled $v_{min}(2,8,1)$ and $v_{max}(2,8,10)$.

It is then shown that these smaller components 108 could be subdivided into x even smaller components (whose size is not shown) using another layout parameter [e.g., $N_{even\_smaller\_components}(2,8,5)=x$], which can be further subdivided, ad infinitum. Also not shown in FIG. 1, are enlargements of the other components 104, sub-components 106, and smaller components 108, which in an exemplary embodiment could also contain twenty sub-components 106, ten smaller components 108, and x even smaller components, respectively.

By subdividing a value range layout into levels of smaller and smaller components and by varying or not varying the size of components at different levels, a multitude of different layout permutations can be defined.

Another layout approach involves a layout representing non-fixed characteristic values. Such a layout may be referred to as a delta value range layout. Such a layout is similar to a fixed value range layout except values are typically represented as delta values from some minimum delta to some maximum delta. Such a layout is relative to the value of some other pulse (e.g., a preceding pulse value), which would have a delta of zero.

It should be noted, however, that although the present exemplary embodiments illustrate various layouts, the invention is not limited to the illustrative examples, and other layouts including, e.g., infinite combinations of similar and different sized components, could also be used within the scope of the present invention. It should also be noted that the pulse characteristics could include any of various temporal, non-temporal, or both temporal and non-temporal characteristics, as will also be recognized by persons skilled in the relevant arts.

B. Non-allowable Regions Within Value Range Layouts

One or more non-allowable regions can be defined in a characteristic value range layout within which a characteristic value is not allowed. A non-allowable region may fully or partially include one or more components, subcomponents or smaller components. A non-allowable region can be based solely on value position within a component, subcomponent, or smaller component or can be based relative to a characteristic value of one or more other pulses. For example, a non-allowable region can be defined such that a pulse characteristic value cannot be less than the minimum value or greater than the maximum value of a given component. Non-allowable regions may alternatively be bounded by minimum and maximum values within a value range layout.

Non-allowable regions can be defined relative to other pulse characteristic values. For example, a minimum value difference between pulse characteristic values can be established by defining a non-allowable region about the characteristic value of another pulse such as the preceding pulse, succeeding pulse, or in other pulse. Similarly, a maximum value difference between pulse characteristic values can be established by defining a non-allowable region consisting of all values greater than or less than some difference from the characteristic value of another pulse. Non-allowable regions can also be defined that are bounded by minimum and maximum difference in value between the characteristic value of the pulse and the characteristic value of another pulse.

FIG. 2 depicts non-allowable regions within a temporal pulse characteristic value range layout. In the top portion of the figure, a component, subcomponent, or smaller component is shown 222, which is bounded by a minimum time value 202 and a maximum time value 204. A pulse 203 is shown at a position within the component and a preceding pulse 206 and succeeding pulse 208 are shown at positions within the preceding and succeeding time period components 224, 226, respectively. Non-allowable regions are shown in layers to illustrate that they can overlap one another. Two non-allowable regions 210 are denoted A, which are used to maintain the correlation properties of a code, where the leftmost region 210 consists of all time prior to the minimum time value 202 of the component to which a code element value is mapped and the rightmost region 210 consists of all time after the maximum time value 204 of the same component. Three non-allowable regions 212, denoted B, are defined that are bounded by minimum and maximum time values. Two regions 214, shown as C, illustrate the application of a minimum proximity limit, where the leftmost region 214 represents a region where a pulse 203 cannot be placed because it would violate the minimum proximity limit relative to the preceding pulse 206, and the second region 214 represents a region where a pulse 203 cannot be placed because it would violate the minimum proximity limit relative to the succeeding pulse 208. Similarly, two regions 216, shown as D, illustrate the application of a maximum proximity limit, where the leftmost region 216 represents a region where a pulse 203 cannot be placed because it would violate the maximum proximity limit relative to the succeeding pulse 208, and the rightmost region 216 represents a region where a pulse 203 cannot be placed because it would violate the maximum proximity limit relative to the preceding pulse 206. One non-allowable region 218, shown as E, is bounded by a minimum and maximum distance from the preceding pulse 206. Two other non-allowable regions 220, identified as F, are bounded by a minimum and maximum distance from the succeeding pulse 208. The bottom portion of the figure depicts the combined effect of the non-allowable regions where the separated layers in the upper portion of the figure are overlaid to show that a given position within a time period component is either allowable or non-allowable.

FIG. 3 depicts non-allowable regions within a non-temporal pulse characteristic value range layout. Such a layout might apply to pulse amplitude or pulse width. In the top portion of the figure, a component, subcomponent, or smaller component is shown, which is bounded by a minimum characteristic value 302 and a maximum characteristic value 304. The characteristic values of two pulses labeled Pulse 1 306 and Pulse 2 308 are shown. As in FIG. 2, non-allowable regions are shown in layers to illustrate that they can overlap one another. Two non-allowable regions 310 are denoted as A, which are used to facilitate mapping a code element value, where the leftmost region 310 consists of all values less than the minimum characteristic value 302 of the component to which a code element value is mapped and the rightmost region 310 consists of all values greater than the maximum characteristic value 304 of the same component. Three non-allowable regions 312, denoted B, are defined that are bounded by minimum and maximum characteristic values. Four regions 314, shown as C, illustrate the application of a minimum value delta with Pulse 1 and Pulse 2 characteristic values 306, 308, where the leftmost two regions 314 represent where a value cannot be used because it would violate the minimum value delta relative to the Pulse 1 characteristic value 302, and the rightmost two regions 314 represent where a value cannot be used because it would violate the minimum value delta relative to the Pulse 2 characteristic value 304. Similarly, two regions 316, shown as D, illustrate the application of a maximum delta rule, where the leftmost region 316 represents where a value cannot be used because it would violate the maximum value delta relative to the Pulse 2 characteristic value 304, and the rightmost region 316 represents where a value cannot be used because it would violate the maximum value delta relative to the Pulse 1 characteristic value 302. Two other regions 316 of the same type as those shown in D are not shown due to the size of the figure. Four non-allowable regions 318, shown as E, are bounded by minimum and maximum value deltas from the two pulse characteristic values 306, 308. The bottom portion of the figure depicts the combined effect of the non-allowable regions where the separated layers in the upper portion of the figure are overlaid to show that a given value within a component is either allowable or non-allowable.

FIGS. 4a through 4d depict non-allowable regions within temporal pulse characteristic delta value range layouts. In FIG. 4a, non-allowable regions relative to a preceding pulse time position 404 are shown. Specifically, a layout relative to a preceding pulse at time position 404, $t_{k-1}$, is shown, where $t_a$, $t_b$, $t_c$, and $t_d$ are time values relative to the preceding pulse. Because time has an inherent order (i.e., by definition the time position value of the pulse in question succeeds the time position value of the preceding pulse), only those values after the preceding pulse are included in the non-fixed layout.

Four delta values, $\Delta t_a$, $\Delta t_b$, $\Delta t_c$, and $\Delta t_d$, illustrate how time values can be translated into delta values in which case the time values $t_{k-1}$, $t_a$, $t_b$, $t_c$, and $t_d$ become 0, $\Delta t_a$, $\Delta t_b$, $\Delta t_c$, and $\Delta t_d$.

Three non-allowable regions 406–410, shown shaded with diagonal lines, are defined. The first region 406 enforces a minimum proximity limit, $\Delta t_{min}$, where $\Delta t_k$ cannot reside between 0 and $\Delta t_a$ and therefore $t_k$ cannot reside between $t_{k-1}$ and $t_a$. The second region 408 is bounded by minimum and maximum delta values, such that $\Delta t_k$ cannot reside between $\Delta t_b$ and $\Delta t_c$, and therefore $t_k$ cannot reside between $t_b$ and $t_c$. The third region 410 enforces a maximum proximity limit, $\Delta t_{max}$, where $\Delta t_k$ cannot be greater than or equal to $\Delta t_d$ and therefore $t_k$ cannot be greater than or equal to $t_d$.

In FIG. 4b, non-allowable regions relative to any preceding pulse position are shown. Specifically, FIG. 4b illustrates that the non-allowable regions can be defined the same way relative to any preceding pulse, so that the only difference between FIG. 4a and 4b is that $t_{k-1}$ becomes $t_{k-n}$.

FIG. 4c and 4d illustrate that similar non-allowable regions can be defined relative to the succeeding pulse position 412, $t_{k+1}$, and to any succeeding pulse position 412, $t_{k+n}$, respectively. In the two figures, the first region 418 enforces a minimum proximity limit, $\Delta t_{min}$, where $\Delta t_k$ cannot reside between $-\Delta t_h$ and 0, and therefore $t_k$ cannot reside between $t_h$ and $t_k+n$. The second region 416 is bounded by minimum and maximum delta values, such that $\Delta t_k$ cannot reside between $-\Delta t_f$ and $-\Delta t_g$ and therefore $t_k$ cannot reside between $t_f$ and $t_g$. The third region 414 enforces a maximum proximity limit, $\Delta t_{max}$, where $\Delta t_k$ cannot be less than or equal to $-\Delta t_e$, and therefore $t_k$ cannot be less than or equal to $t_e$.

FIG. 5 illustrates non-allowable regions within a non-temporal characteristic delta value range layout relative to any other pulse having some characteristic value 500, $v_{k\pm n}$. This figure is consistent with (and similar to a combination of) FIGS. 4b and 4d. Here, six non-allowable regions 502–512 are shown with the three leftmost regions 502–506 mirroring the three rightmost regions 508–512. Note the figure is two-sided as opposed to one-sided since a non-temporal characteristic value of a pulse can be less than, greater than, or the same as that of any other pulse.

Generally, non-allowable regions within a delta value range layout can be represented as a general non-allowable region set, $S_{na}$, where $S_{na}$ is equal to a union of some number, n, of defined non-allowable regions, $R_i$, relative to a zero reference delta value, where i=1 to n.

$$S_{na} = R_1 \cup R_2 \cup \ldots \cup R_n$$

Each non-allowable region, $R_i$, within the general non-allowable region set $S_{na}$ can be specified as a delta value range in which a delta value cannot reside.

$$R_i = \Delta t_k \notin [\Delta t\_low_i, \Delta t\_high_i]$$

This process allows a set of non-allowable regions, $S_{na}^{(n)}$, to be defined relative to any pulse position, $t_n$, by adding its time to the general non-allowable region set, $S_{na}$.

$$S_{na}^{(n)} = t_n + S_{na} = \{t_n + s : s \in S_{na}\}$$

Furthermore, the non-allowable regions to be enforced against a given pulse can be generally defined as:

$$t_k \notin YS_{na}^{(j)}$$
$$j \in I(k)$$

which states that the time position of pulse k cannot be an element of a union of non-allowable region sets about pulses j, where j ranges over all members of an index set I(k). This general equation allows the index set, I(k), to be any combination of pulses within the pulse train. Example index sets include but are not limited to:

I(k)={k−1}→preceding pulse
I(k)={k+1}→succeeding pulse
I(k)={0,1, . . . , k−1}→all preceding pulses
I(k)={k+1, . . . , $k_{max}$}→all succeeding pulses With the use of an index set, I(k), the enforcement of non-allowable regions can be considered conditional in that non-allowable regions are only applied to those pulses residing in the index set. Another form of conditional enforcement could be based on a maximum number of pulse characteristic values that are allowed to reside in a non-allowable region (i.e., after some number of code element values indicate pulse characteristic values which reside in some non-allowable region or regions, no additional code element values are allowed to map to the non-allowable region or regions). This form of conditional enforcement could also be done using an allowable/non-allowable threshold based on a percentage of the pulses.

Relative non-allowable regions in a fixed or non-fixed value range layout can be based on statistical values calculated for some subset of pulse characteristic values such as a minimum, maximum, average, mode, or other such quantity. For example, a non-allowable region could be specified relative to an average characteristic value of all preceding pulses.

C. Discrete Value Layouts

Figure 6A:
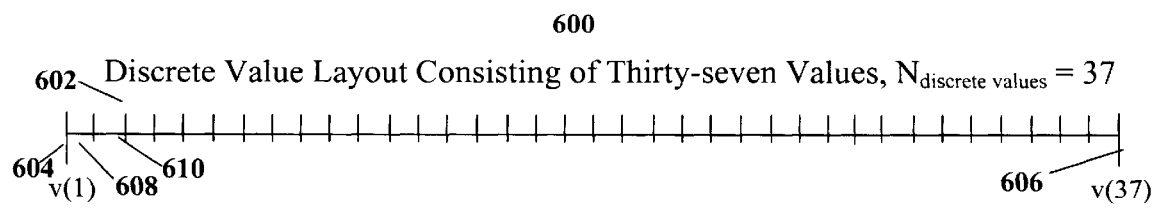
FIG. 6a illustrates an exemplary discrete value layout of thirty-seven exemplary evenly distributed values including exemplary layout parameters.
Figure 6B:
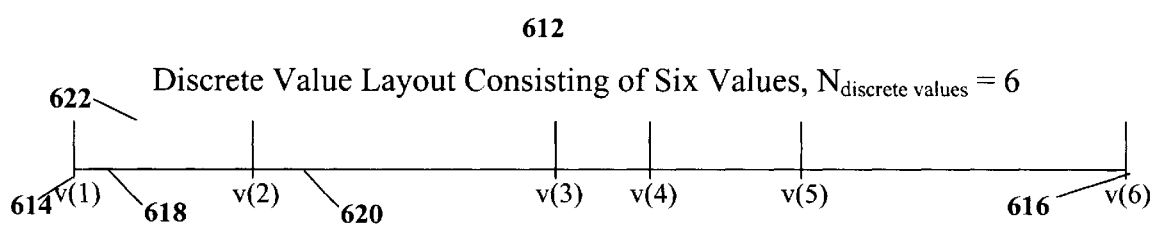
FIG. 6b illustrates an exemplary discrete value layout of six exemplary non-evenly distributed values including exemplary layout parameters.

Another exemplary embodiment of the present invention defines a layout of pulse characteristic values by specifying a layout of discrete characteristic values to which individual code elements can map. As depicted in FIGS. 6a and 6b, a layout parameter, $N_{discrete\ values}$ can be specified to identify some number of discrete values within a layout having a value, v(n), with an index n, where n=1 to $N_{discrete\ values}$. Discrete values may, e.g., be evenly distributed, or not, as depicted in FIGS. 6a and 6b, respectively.

Beginning with FIG. 6a, a diagram 600 illustrates an exemplary embodiment in which thirty-seven (37) evenly-distributed (the first two width values are labeled 608, 610) discrete characteristic values, v(1) 604 through v(37) 606, are shown. In the exemplary embodiment, the number of discrete values 604, 606 within layout 602 is thirty-seven (37) and is referred to as $N_{discrete\ values}=37$.

FIG. 6b depicts, in an exemplary embodiment, a diagram 612 illustrating six (6) non-evenly-distributed (the first two width values are labeled 618 and 620) discrete characteristic values, v(1) 614 through v(6) 616. In the exemplary embodiment, the number of discrete values 614, 616 within layout 622 is six (6) and is referred to as $N_{discrete\ values}=6$.

D. Combinations of Value Range and Discrete Value Layouts

In one exemplary embodiment of the present invention, the discrete value layout embodiments illustrated in FIGS. 6a and 6b, described above, can be combined with an embodiment of a value range layout such as, e.g., the value range layout 102 of FIG. 1, enabling code element values to specify, e.g., a component 104 within the value range layout 102 and a discrete value within the component 104 (not shown). The use of a combination of the discrete value layout and value range layout approaches is shown in FIG. 7.

Figure 7:
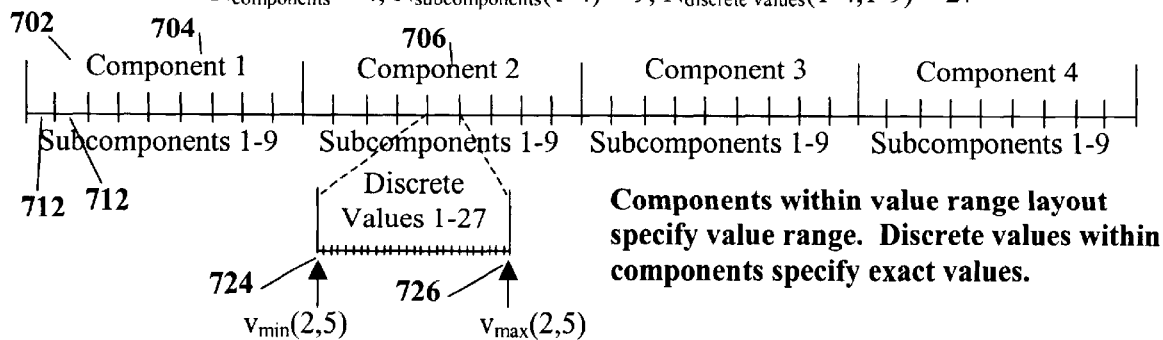
FIG. 7 illustrates an exemplary combined value range/discrete value layout of four exemplary components subdivided into nine exemplary sub-components containing 27 exemplary discrete-values each including exemplary layout parameters.

Specifically, FIG. 7 illustratively depicts a diagram 700 showing an exemplary embodiment of the invention using a combination of a discrete value layout similar to the one depicted in FIG. 6*a*, and a value range layout similar to that shown in FIG. 1. Referring now to FIG. 7, a value range layout 702 is subdivided into four (4) components (the first two are labeled 704, 706) that are subdivided into nine (9) sub-components (the first two are labeled 712, 714). Component 2 706 is shown with a sub-component 712 which has been further expanded to illustrate discrete values from $v_{min}(2,5)$ 724 to $v_{max}(2,5)$ 726. Thus, as illustrated, each sub-component 712 contains 27 discrete values. The layout 702 of the exemplary embodiment of diagram 700 could, e.g., be specified by setting $N_{components}$=4, $N_{sub-components}$ (1–4)=9, and $N_{discrete\ values}$(1–4,1–9)=27.

II. Numerical Code Generation

Various numerical code generation methods can be employed to produce codes. Generally, each method produces codes that tend to have certain correlation or spectral properties. A code can be generated using a quadratic congruential, hyperbolic congruential, linear congruential, Costas array or other such numerical code generation technique designed to generate codes guaranteed to have certain correlation properties.

A quadratic congruential code of integer values can be generated using an equation of the general form:

$$y^{QC}_{i,\alpha,\beta}(k) \equiv [i(k+\alpha)^2 + \beta] \bmod p$$
$$k = 0, 1, \ldots, p-1; \quad i \in \{1, 2, \ldots, p-1\};$$
$$\alpha, \beta \in \{0, 1, \ldots, p-1\},$$

where p is a prime number. Each quadratic congruential code has p elements and $p^3-p^2$ different sequences can be generated by changing the value of parameters i, $\alpha$, and $\beta$. Quadratic congruential codes have correlation properties that guarantee a maximum of two coincidences when autocorrelated with some time offset and a maximum of four coincidences when cross-correlated with another quadratic congruential code.

A hyperbolic congruential code of integer values can be generated using an equation of the general form:

$$y^{HC}_i(k) = (ik^{-1}) \bmod p \quad 1 \le i, k \le p-1,$$

where p is a prime number $\ge 2$ and $k^{-1}$ is the unique inverse of k modulo p. Each hyperbolic congruential code has p–1 elements and p–1 different sequences can be generated. Hyperbolic congruential codes have correlation properties that guarantee a maximum of two coincidences when autocorrelated with some time offset and a maximum of two coincidences when cross-correlated with another hyperbolic congruential code.

A linear congruential code of integer values can be generated using an equation of the general form:

$$y^{LC}_{i,\beta}(k) \equiv (ik+\beta) \bmod p \quad 1 \le i, k \le p-1; \quad \beta \in \{0, 1, \ldots, p-1\},$$

where p is a prime number. Each linear congruential code has p–1 elements and p–1 different sequences can be generated. Linear congruential codes have correlation properties that guarantee a maximum of 1/ln(p–1) coincidences when autocorrelated with some time offset and a maximum of 2/(p–1) coincidences when cross-correlated with another linear congruential code.

A Costas Array code of integer values can be generated by Welch construction using an equation of the general form:

$$y^{WC}_{R,i,\alpha,\beta}(k) \equiv (iR^{(k+\alpha)} + \beta) \bmod p$$
$$k + \alpha = 1, \ldots, p-1; \quad i \in \{1, 2, \ldots, p-1\};$$
$$\alpha, \beta \in \{0, 1, \ldots, p-1\},$$

where p is a prime number and R is a primitive element of p. Each Welch-Costas code has p–1 elements and $p^2$ different sequences can be generated. Welch-Costas codes have correlation properties that guarantee a maximum of one coincidence when autocorrelated with some time offset and a maximum of $\lambda$ coincidences when cross-correlated with another Welch-Costas code, where $R_1 = R_2^\lambda$.

A Costas Array code of integer values can also be generated by Golomb construction using an equation of the general form:

$$y^{GC}_{\eta,i,\alpha,\beta}(k) \equiv (\log_\eta(1 - \alpha^{(i-k)}) + \beta) \bmod p$$
$$k = 1, \ldots, p-2; \quad i \in \{1, 2, \ldots, p-2\};$$
$$\alpha, \beta \in \{0, 1, \ldots, p-1\},$$

where p is a prime number and $\eta$ is a primitive element of p. Each Golomb-Costas code has p–2 elements and $(p-1)^2$ different sequences can be generated. Golomb-Costas codes have correlation properties that guarantee a maximum of one coincidence when autocorrelated with some time offset and a maximum of l and m coincidences when cross-correlated with another Welch-Costas code, where $\eta_1 = \eta_2^m$ and $\alpha_1 = \alpha_2^l$.

Each of these alternative code generation schemes has corresponding characteristics to be considered in relation to the application of the pulse transmission system employing the code. For example, Costas codes have nearly ideal autocorrelation properties but somewhat less than ideal cross-correlation properties, while linear congruential codes have nearly ideal cross-correlation properties but less than ideal autocorrelation properties. In some cases, design tradeoffs require that a compromise between two or more code generation schemes be made such that a code is generated using a combination of two or more methods. An example of such a compromise is an extended quadratic congruental code generation approach that uses two 'independent' operators, where the first operator is linear and the second operator is quadratic. Accordingly, one, two, or more code generation schemes or combinations of such schemes can be employed to generate a code without departing from the scope of the invention.

Instead of employing a numerical code generation technique designed to produce codes with guaranteed correlation properties, a numerical code generation technique that produces pseudorandom codes can be used. A pseudorandom code can be generated using a computer's random number generator, binary shift-register(s) mapped to binary words, a chaotic code generation scheme, or another well-known technique. Such 'random-like' codes are attractive for certain applications since they tend to spread spectral energy over multiple frequencies while having 'good enough' correlation properties, whereas designed codes may have superior correlation properties but have spectral properties that may not be as suitable for a given application.

Computer random number generator functions can in one embodiment employ a linear congruential generation (LCG)

method, which generates an n-th random number, $x_n$, from a previous random number, $x_{n-1}$, using an equation of the general form as follows:

$$x_n = Ax_{n-1} + c \pmod{m}$$

where n identifies a given code in the generated code sequence, and the generated sequence is characterized by the multiplier A, the additive constant c, the modulus m, and an initial seed $x_0$. These random number generator functions can be referred to as LCG(a,c,m,$x_0$), which determines the sequence generated.

Another exemplary embodiment of another method that can be used as a computer random number generator is known as a Additive Lagged-Fibonacci Generator (ALFG) method. The approach can be described by an equation of the form:

$$x_n = x_{n-j} + x_{n-k} \pmod{2^m}, j < k$$

where n identifies a given code in the generated code sequence, and j and k represent offsets to previously generated codes. The period of these generators is $(2^k-1)2^{m-1}$ and they are referred to as ALFG(l,k,m,$x_0$), which determines the sequence generated.

Binary shift-register pseudo-random number generators can be implemented in many different ways. In an exemplary embodiment, a linear feedback shift register as illustrated in FIG. 8a, can be used FIG. 8a illustratively depicts a block diagram 802 including an exemplary embodiment of an LCG linear feedback shift register, including exclusive OR logic gate 804 having two inputs 806, 808 and one output 810. Eight bit shift register 814 (labeled bit 0 814a through bit 7 814h includes shift out output 812 coupled to input 806 of exclusive OR logic gate 804. Bit 3 814d is coupled to input 808 of exclusive OR logic gate 804, and output 810 of exclusive OR logic gate 804 is coupled as shown to bit 7 814h.

The linear feedback shift register can be described by an equation of the form:

$$x_{n+k} = \sum_{i=0}^{k-1} a_i x_{n+i} \pmod{2}$$

where n identifies a given code in the generated code sequence, k is the number of bits in the shift register, $a_i$ is the value of the i-th bit in the shift register. The sequence of bits that is generated depends on the initial shift-register state and which shift-register bit value, $a_i$, is fed back into the exclusive-OR device 804 along with the shifted output 812.

The ALFG method can also be implemented using a shift register and a modulo adder device 818, as shown in FIG. 8b. FIG. 8b depicts diagram 816 including an eight-bit shift register having bit 0 828a through bit 7 828h. Diagram 816 also includes addition modulo 2 device 818 having two inputs 820 (coupled to bit 7 928h) and 822 (coupled to bit 5 828f), and an output 824 which can be outputted and can be fed back into input 826 of the ALFG shift register at bit 0 828a.

The ALFG shift register can be described by an equation of the form:

$$x_n = x_{n-j} + x_{n-k} \pmod{2}, j < k$$

where n identifies a given code in the generated code sequence, and j and k represent the shift-register bits 828h, 828f fed into the modulo adder device 818.

In other exemplary embodiments of the present invention, many other different but related alternative approaches for generating pseudorandom code sequences can also be employed. For example, alternative embodiments include inversive congruential generators, explicit-inversive congruential generators, multiple recursive generators, and combined LCGs. Any of these or other similar traditional methods can be used to generate a pseudorandom code without departing from the scope of the invention, as will be apparent to those skilled in the relevant art.

In addition to the embodiments already described for generating pseudorandom codes, several other exemplary embodiments can be employed including, e.g., chaotic code generators and Optimal Golomb Ruler (OGR) code generators. Any of these, and other alternative methods can also be used to generate a pseudorandom code without departing from the spirit and scope of the invention as will be apparent to those skilled in the relevant art.

III. Mapping Code Elements to Pulse Characteristics

After a code has been generated using a numerical code generation technique, the code element values are mapped to pulse characteristic values per the defined value range and/or discrete value layout. If a value range layout was employed, a code element value specifies a component, subcomponent, or smaller component having some characteristic value range from a minimum characteristic value to a maximum characteristic value (as previously described). In such cases, an offset value, (i.e., a value amount to be added to the minimum characteristic value) may be used to specify an exact value within the value range of the component to which a given code element maps.

The following description provides a detailed example of the mapping of QC codes to a temporal value range layout such that the specified pulse train has certain desirable correlation properties. It should be noted that the described exemplary code element mapping approach is generally applicable using codes produced by any of the previously described code generation methods to value range and/or discrete value layouts of temporal or non-temporal pulse characteristic values, as will be recognized by persons skilled in the relevant arts. It should also be noted that the value range layout used in the example does not include non-allowable regions.

FIG. 9 depicts the generation of QC codes 902a–902f and the mapping of the $5^{th}$ code 902e to a time layout 904. The code generation equation, $y(k) = ik^2 \bmod 7$ (906), is consistent with the general form discussed earlier where $\alpha$ and $\beta$ have both been assigned a value of 0, and p has been assigned a value of 7. Six codes 902a–902f representing six channels are produced and displayed in matrix form where the darkened squares 908 represent code element values. Thus for channels i=1 to 6, the six codes 902a–902f presented are {0,1,4,2,2,4,1}, {0,2,1,4,4,1,2}, {0,3,5,6,6,5,3}, {0,4,2,1,1,2,4}, {0,5,6,3,3,5}, and {0,6,3,5,5,3,6}. The outlined region 910 about the $5^{th}$ code 902e (i=5) illustrates how the code 902e maps to a time layout 904 consisting of seven components 912, or frames, where each frame 912 is subdivided into seven sub-components 914, or sub-frames. Each column k maps to a frame 912 and the row y(k) highlighted for each column k represents the sub-frame 914 y(k) in which to place a pulse. The bottom of the figure illustrates how the time layout repeats. As shown, the last frame 912 of a preceding time layout 916 is contiguous with the first frame 912 of a current time layout 918 and the last frame 912 of the current time layout 918 is contiguous with the first frame 912 of the following time layout 920. Thus, whenever the start of a time layout 918 is shifted in time by some offset, a code wrapping effect occurs.

Figure 10:
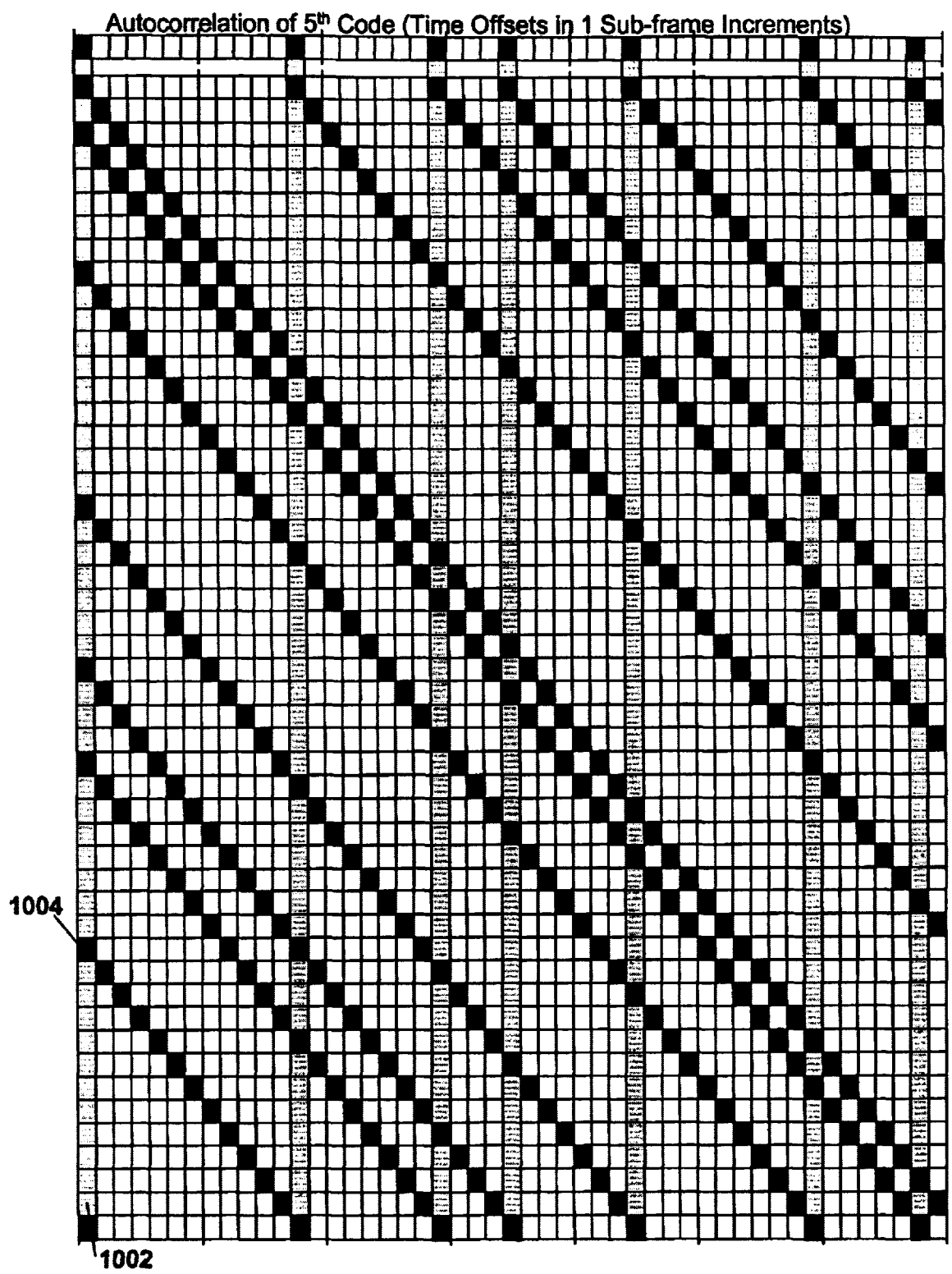
FIG. 10 illustrates autocorrelation properties of the $5^{th}$ channel code of FIG. 9.
Figure 11A:
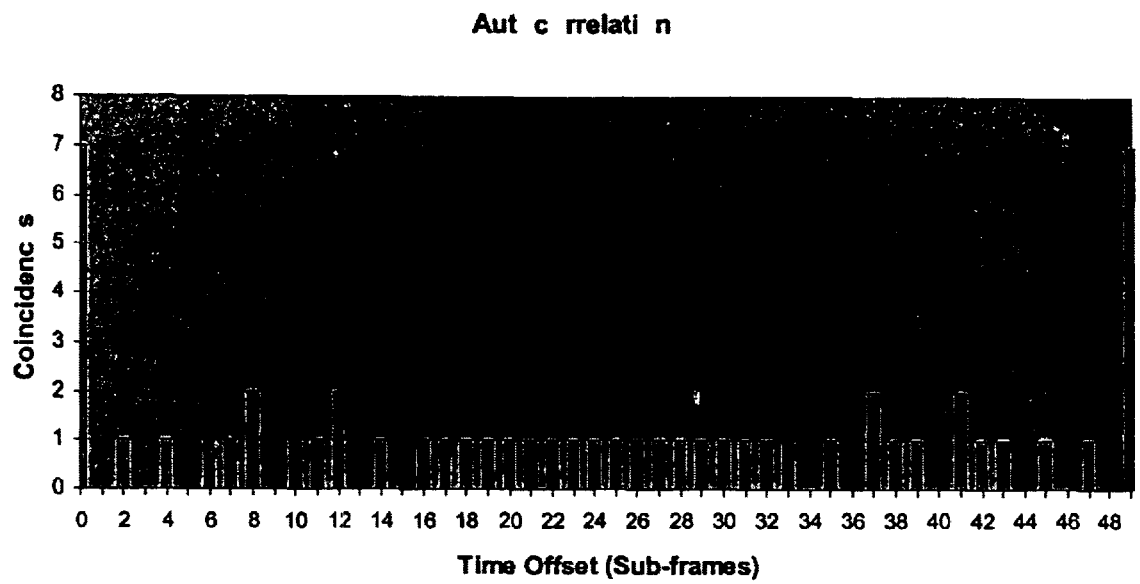
FIG. 11a is a plot diagram for illustrating the number of coincidence against a time offset in the example of FIG. 9.
Figure 11B:
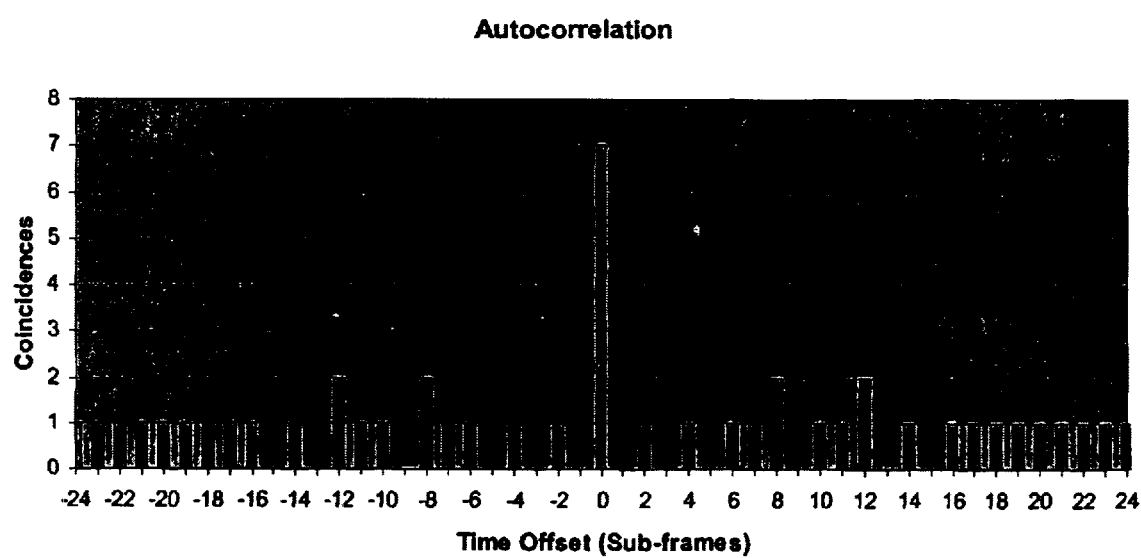
FIG. 11b is an example embodiment of a plot illustrating moving and re-plotting the data of FIG. 11a producing an exemplary 'thumbtack' plot.

FIG. 10 presents the autocorrelation properties of the $5^{th}$ code 902e where the time period layout 904 shown in FIG. 9 is correlated against other instances of the time layout 904 that are incrementally shifting in time by offsets equal to multiples of the width of a sub-frame 914. The figure illustrates how the wrapping effect takes place, where with each shift of the correlated time layout 904, the last sub-frame 914 is moved or 'wraps' to the front of the time layout 904. The striped bars 1002 are used to identify the coincidences that occur when the time period is correlated against the shifted instances of itself. Whenever a darkened sub-frame appears behind a striped bar 1002, a coincidence 1004 occurs. Thus it can be seen that when correlated against itself with no time offset, a total of seven coincidences 1004 occur, while for other offsets the number of coincidences 1004 varies from zero to two. FIG. 11a plots the number of coincidences 1004 versus the time offset (i.e., number of sub-frames 914 shifted). FIG. 11b plots the same data where the last half of the plot is moved to the front of the plot, which is allowable due to the wrapping effect described previously. This moving and re-plotting of the data produces what is commonly referred to as a 'thumbtack' plot.

Figure 12:
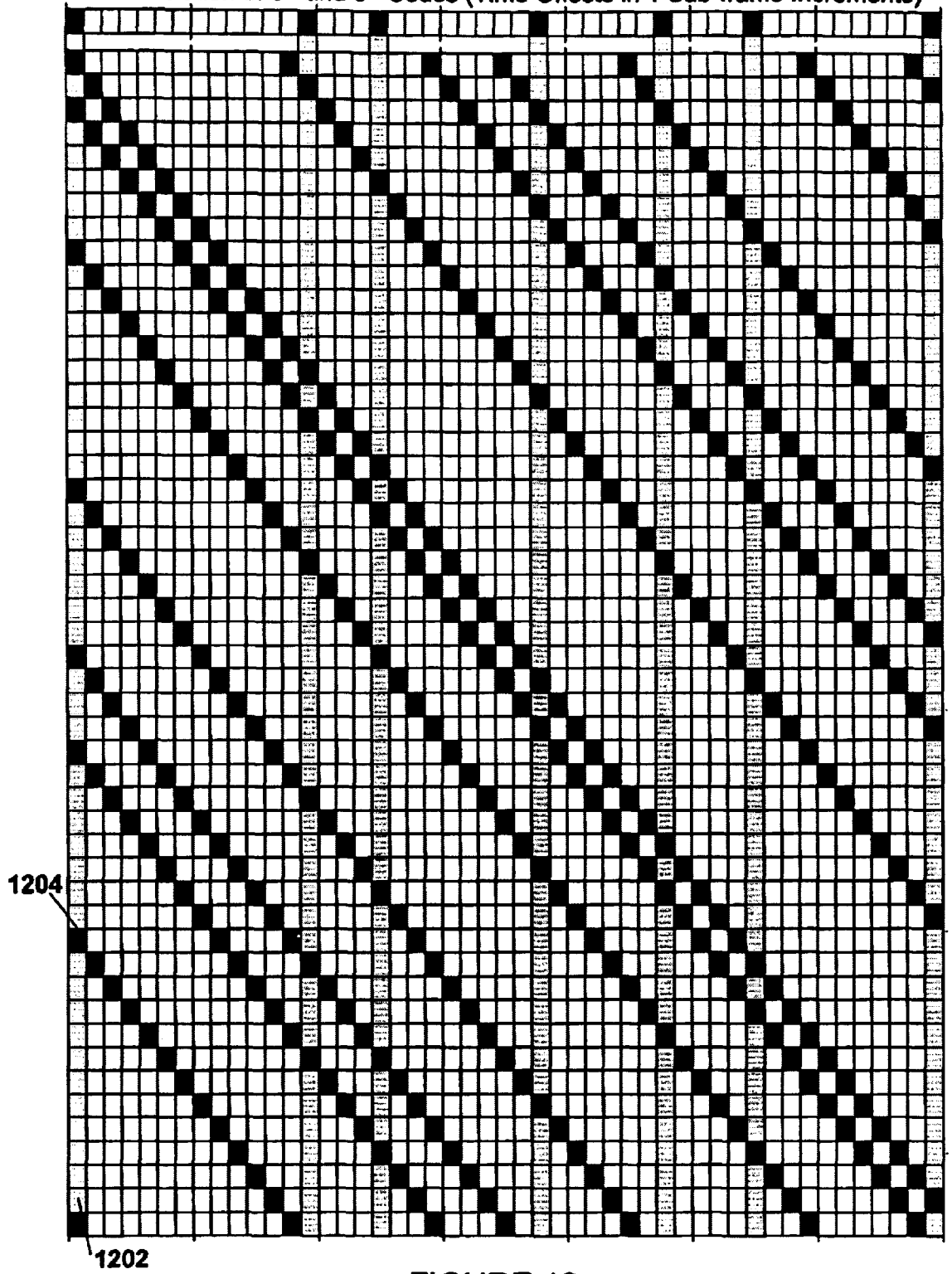
FIG. 12 illustrates cross-correlation properties of the $6^{th}$ channel code relative to the $5^{th}$ channel code of FIG. 9.
Figure 13:
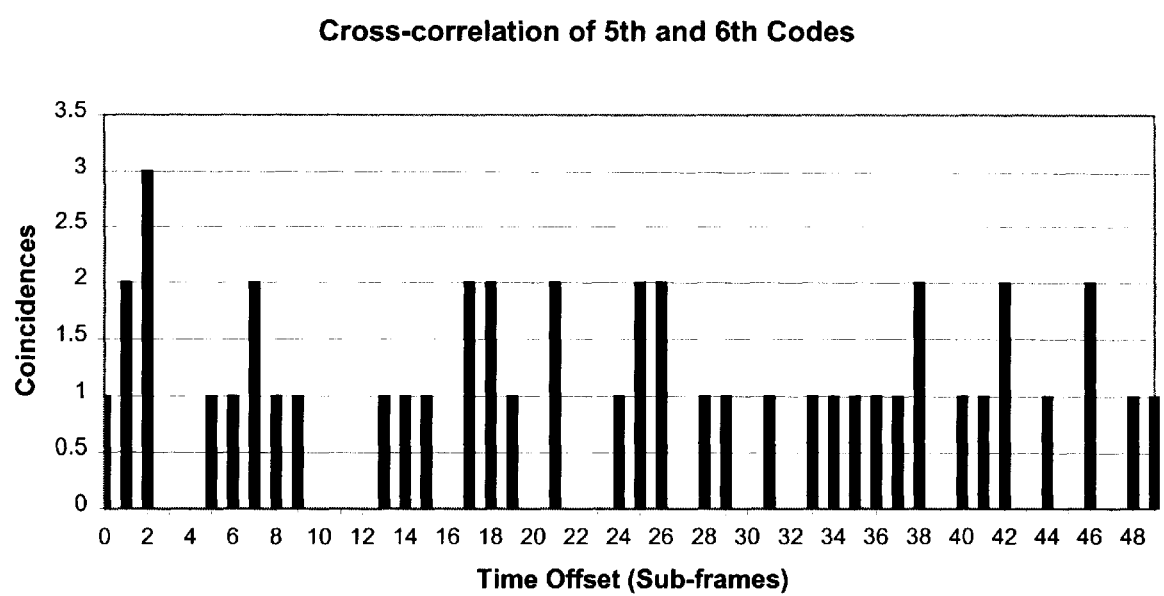
FIG. 13 is an example embodiment of a plot illustratively plotting coincidences of the cross-correlaton of the $6^{th}$ and $5^{th}$ codes by time offset.

FIG. 12 presents the cross-correlation of the $5^{th}$ code 902e and the $6^{th}$ code 902f. In this figure a pulse train produced by mapped the $6^{th}$ code 902f is shown correlated against instances of the $5^{th}$ code 902e that are incrementally shifted in time by offsets equal to multiples of the width of a sub-frame 914. The striped bars 1202 are used to identify coincidences 1204 that occur when the time period 904 produced with the $6^{th}$ code 902f is correlated against the shifted instances of a time layout 904 produced with the $5^{th}$ code 902e where coincidences 1204 can be seen whenever a darkened sub-frame 914 appears behind a striped bar 1202. It should be noted that the instances of the $5^{th}$ code 902e shown in FIG. 12 are the same as those shown in FIG. 10. The cross-correlation of these two codes 902e 902f is depicted in FIG. 13, which shows the maximum number of coincidences 1204 that occurs is three.

Figure 14:
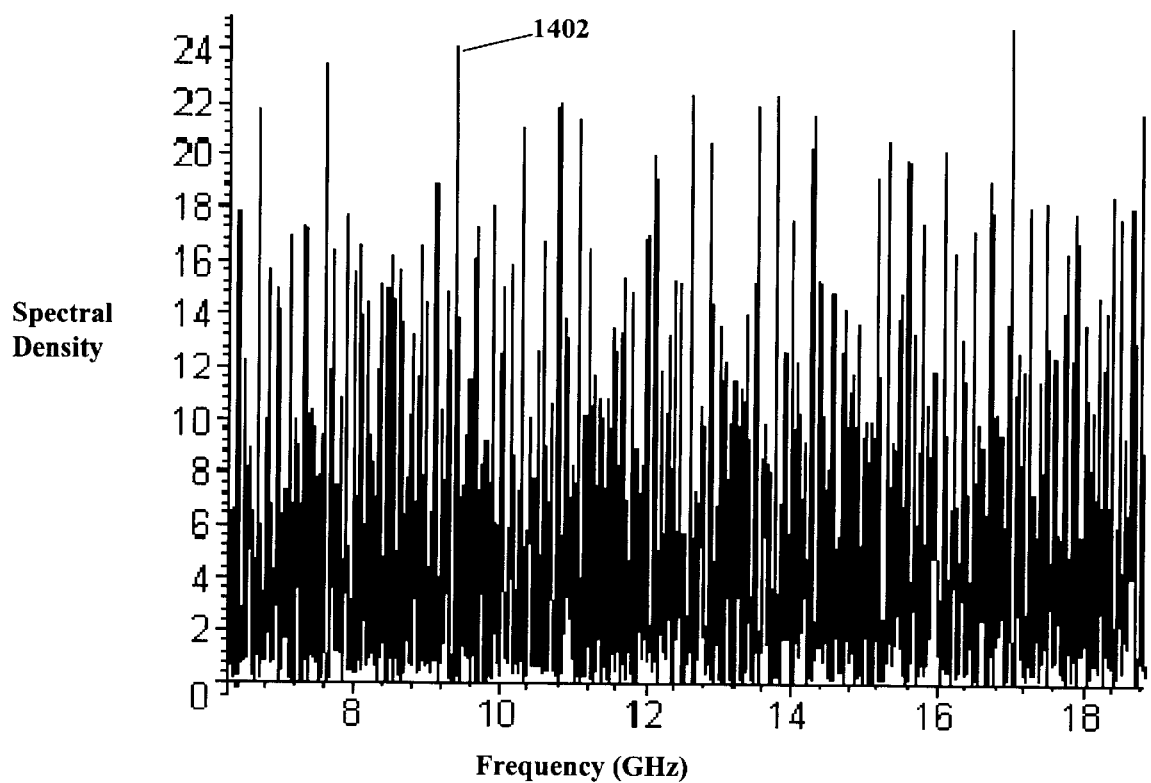
FIG. 14 illustrates a plot of the energy spectrum of a quadratic congruential code.

FIG. 14 depicts the energy spectrum of a pulse train generated using a QC code like those presented in FIG. 9. In the figure, spectral density 1402 is plotted versus frequency. For a given TM-UWB application, the maximum and/or average spectral density amplitude within some frequency bandwidth of interest may be required to be within some limit.

IV. Evaluating Codes Against Acceptance Criteria

The present invention determines whether or not a code is acceptable for a given TM-UWB application by evaluating the code against predefined acceptance criteria governing spectral properties, correlation properties, code length, number of code family members (i.e., channels), etc. Acceptance criteria pertaining to spectral properties may be established to limit the minimum, maximum or average spectral density at any frequency within some bandwidth of interest. Acceptance criteria pertaining to a correlation property may be established to limit the maximum number of autocorrelation or cross-correlation coincidences (e.g., such as described for the numerical code generation techniques) or limit the average number of autocorrelation or cross-correlation coincidences. Acceptance criteria may also be established to limit the maximum or average ratio of autocorrelation coincidences with some time offset to autocorrelation coincidences without some time offset (commonly referred to as the side lobe to main lobe ratio).

Acceptance criteria can also be established governing properties of a code that has been mapped to a layout of temporal and/or non-temporal characteristic values, which may include one or more non-allowable regions. Acceptance criteria may be established to limit the number of code elements within a code that map to non-allowable regions. For example, if a system requires RESET periods within frames, such periods could be defined-as non-allowable regions within a time value range layout. When mapping a code to the layout, a characteristic value specified by a code element that resides within a non-allowable region (i.e., a RESET period) could disqualify a code. Alternatively, a limited number of code elements may be allowed to map to non-allowable regions thereby limiting adjustments that can be made to a code. For example, acceptance criteria may establish a maximum number of non-allowable characteristic values that can be adjusted to the closest values outside non-allowable regions, above which the code is considered unusable, or acceptance criteria may limit the number of pulses that are discarded (e.g., since their time positions are not allowed).

The following description provides a hypothetical example of the application of code acceptance criteria to produce pulse trains that accommodate a given TM-UWB application's requirements. In one exemplary embodiment of the invention, a family of codes to be used by a frame-based pulse transmission system that transmits at most one pulse per one-hundred nanosecond (100 ns) frame must meet the following eight acceptance criteria to accommodate radio application requirements:

1. The code family must have at least ten members.
2. The number of pulses within each pulse train must be at least 80.
3. The number of code elements within each code cannot exceed 102.
4. The maximum number of autocorrelation coincidences for some time shift cannot exceed two.
5. The maximum number of cross-correlation coincidences between any two codes (i.e., channels) cannot exceed four.
6. The average number of cross-correlation coincidences must be less than two.
7. Peak spectral density between 1 MHz and 3 GHz frequencies must be less than 50 microwatts per hertz ($\mu$W/Hz).
8. Pulses cannot reside within the last ten percent (10%) of frames.

To meet correlation-related acceptance criteria, the QC numerical code generation technique is employed because it guarantees a maximum number of autocorrelation coincidences of two (per criteria #4) and a maximum number of cross-correlation coincidences of four (per criteria #5). The prime number eighty-three (83) is selected for input into the QC code generation equation to provide a family of codes with a number of members that is at least 10 (per criteria #1) where each code has a number of code elements that is at least eighty (per criteria #2) and that does not exceed 102 (per criteria #3). Note: As described previously, the QC numerical code generation method requires input of a prime number, p, and produces a family of p−1 codes of length p.

A family of eighty-two (82) codes, each having 83 code elements, is produced using the QC code generation technique. The average number of cross-correlation coincidences is determined for each code against all other members of the code family. Note: Although the QC numerical code generation method guarantees the maximum number of cross-correlation coincidences for any two codes is four or less, there is no guaranteed average number of coincidences. Twenty-two (22) of the 82 codes fail criteria #6 and are discarded. The energy spectrum is calculated for the remaining sixty (60) codes. Twelve of the 60 codes fail criteria #7 and are discarded leaving forty-eight (48) codes that passed the first seven acceptance criteria.

A time value range layout of 83 100 ns frames, subdivided into 83 sub-frames each, is defined where the last ten percent of each frame is defined as a non-allowable region (per criteria #8). The 48 remaining codes are mapped to the defined time layout, where code elements that map to non-allowable regions are ignored (i.e., pulses are not placed). Of the 48 codes, seven codes do not contain code elements that map to non-allowable regions, five codes contain code elements that map to no more than three non-allowable regions, and the remaining thirty-six (36) codes contain code elements that map to four or more non-allowable regions. The 36 codes containing code elements that map to four or more non-allowable regions are discarded since the pulse trains they define would have less than 80 pulses and would, therefore, fail criteria #8. The remaining twelve codes are selected since they pass all acceptance criteria.

A final acceptance "test" could also be conducted to determine the channelization quality of TM-UWB radios employing the selected codes. Twelve radios using the selected codes could be simultaneously operated within a test environment that closely emulates the expected operational environment. Acceptance criteria used for the test might include a minimum signal-to-noise ratio (SNR), minimum bit error rate (BER), etc. Based on test results, the ability of the codes to meet the channelization requirements of the radio application could be determined.

Acceptance criteria may also be applied to a subset of the code elements making up a code. In particular, the average spectral density of a code subset may differ significantly from that of the entire code. For certain applications acceptance criteria pertaining to spectral properties may need to be evaluated against any subset M of a code of length N (e.g., any 10 consecutive code elements of an 83 length code). For example, the seventh acceptance criteria in the previous example could have been evaluated against all possible subsets of ten pulses (i.e., code elements).

Although the example above pertains to pulse time positioning, someone skilled in the art could similarly apply acceptance criteria to non-temporal characteristics without departing from the scope of the invention.

V. Non-employment of Unacceptable Codes

If a code does not meet predefined acceptance criteria, the present invention does not employ the code to specify a pulse train, effectively discarding the code, for use with a given application. The method of the present invention of evaluating codes against predefined acceptance criteria can be applied to multiple codes to determine a family of codes that meet requirements of an application.

According to the present invention, at least one fixed or non-fixed temporal and/or non-temporal value range and/or discrete value layout is specified, which may include one or more non-allowable regions. One or more codes having predefined properties are generated using at least one code generation method. Each code or subset of each code is evaluated against predefined acceptance criteria, and only those codes that meet acceptance criteria are employed.

A code may be a sequence of symbols, e.g., integers, or a sequence of temporal and/or characteristic values, e.g., time positions in nanoseconds. Acceptance criteria can be applied to the code or to the code as mapped to characteristic values.

As described previously, acceptance criteria may limit the number of temporal characteristic values or non-temporal characteristic values within at least one non-allowable region, where a non-allowable region may be relative to at least one characteristic value of at least one pulse.

According to the present invention, acceptance criteria may pertain to a spectral property. Such acceptance criteria may limit the minimum, maximum, or average spectral density at any frequency within some bandwidth of interest.

Acceptance criteria may pertain to an autocorrelation property. Acceptance criteria may limit the maximum or average number of pulse coincidences of a pulse train when correlated against an instance of itself that is offset in time. Similarly, acceptance criteria may limit the maximum or average ratio of pulse coincidences when correlated against an instance of itself that is offset in time to pulse coincidences when correlated against an instance of itself that is not offset in time.

Acceptance criteria may pertain to a cross-correlation property. Acceptance criteria may limit the maximum or average number of pulse coincidences when correlated against another pulse train that is offset in time.

Acceptance criteria may require a code's length to be within a minimum length and a maximum length.

Acceptance criteria may require that a code family have a minimum number of members.

VI. Exemplary Transceiver Implementation

Transmitter

Figure 15:
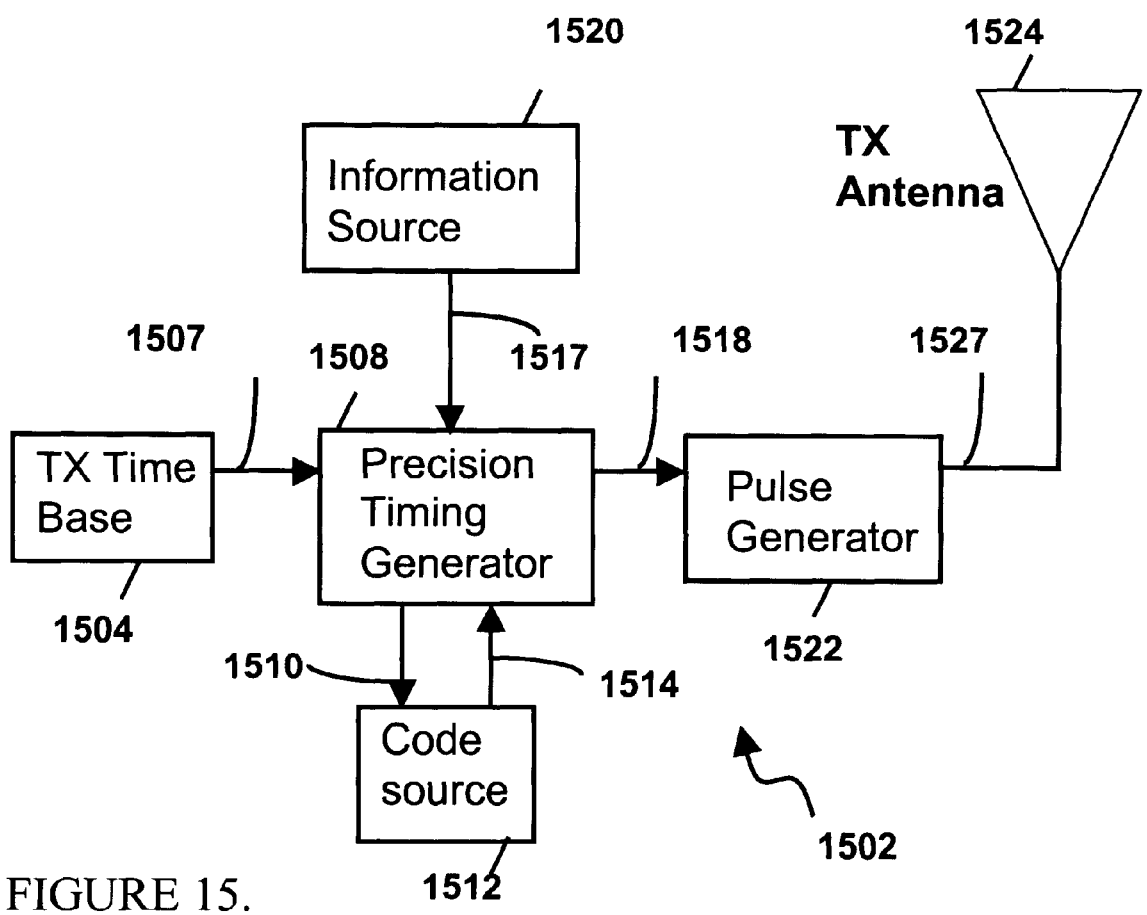
FIG. 15 is a block diagram of an impulse transmitter that advantageously uses the present invention.

Referring to FIG. 15, an exemplary embodiment of an impulse radio transmitter 1502 of an impulse radio communication system having one subcarrier channel that advantageously employs the above-described invention is shown.

The transmitter 1502 comprises a time base 1504 that generates a periodic timing signal 1507. The time base 1504 typically comprises a voltage controlled oscillator (VCO), or the like, having a high timing accuracy and low jitter, on the order of picoseconds (ps). The voltage control to adjust die VCO center frequency is set at calibration to the desired center frequency used to define die transmitter's nominal pulse repetition rate. The periodic timing signal 1507 is supplied to a precision timing generator 1508.

The precision timing generator 1508 supplies synchronizing signals 1510 to the code source 1512 and utilizes the code source output 1514 together with an internally generated subcarrier signal (which is optional) and an information signal 1517 to generate a modulated, coded timing signal 1518.

The code source 1512 comprises a storage device such as a random access memory (RAM), read only memory (ROM), or the like, for storing suitable time-hopping codes and for outputting the time-hopping codes as a code signal 1514. Alternatively, maximum length shift registers or other computational means can be used to generate the time-hopping codes.

An information source 1520 supplies the information signal 1517 to the precision timing generator 1508. The information signal 1517 can be any type of intelligence, including digital bits representing voice, data, imagery, or the like, analog signals, or complex signals.

Figure 16:
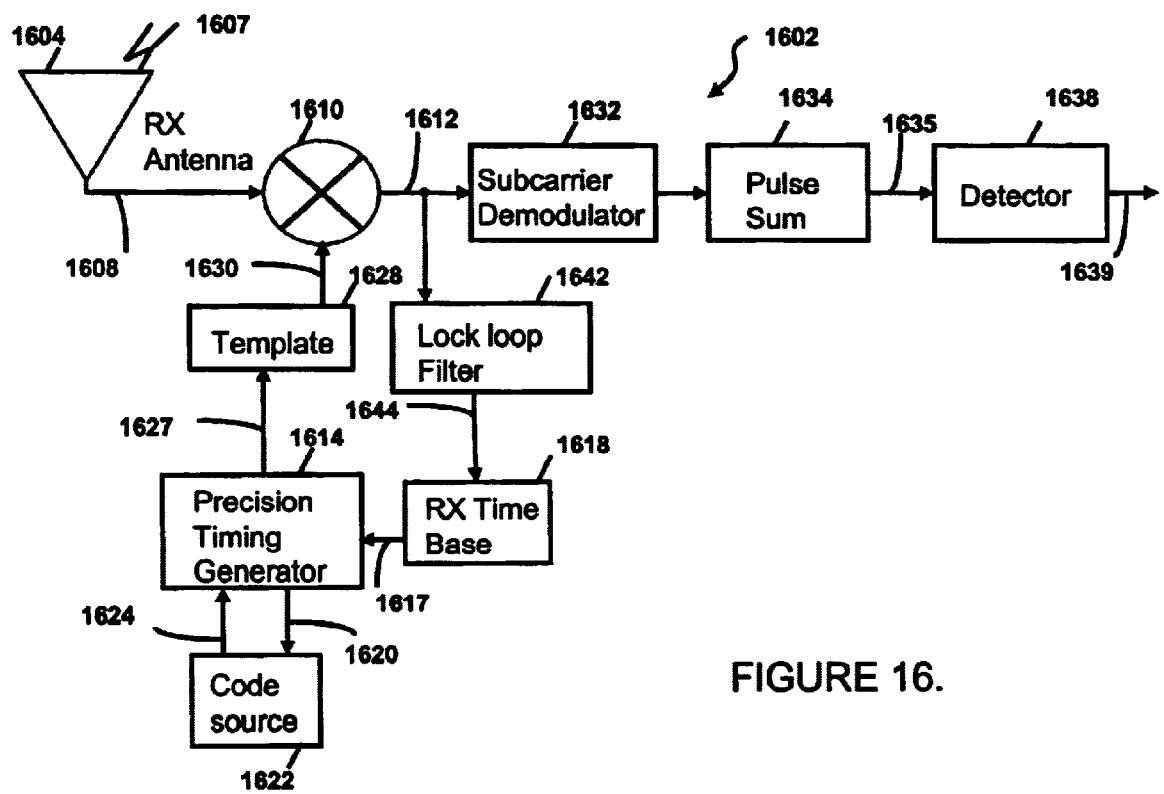
FIG. 16 is a block diagram of an impulse transmitter that advantageously uses the present invention.

A pulse generator 1522 uses the modulated, coded timing signal 1518 as a trigger to generate output pulses. The output pulses are sent to a transmit antenna 1524 via a transmission line 1527 coupled thereto. The output pulses are converted into propagating electromagnetic pulses by the transmit antenna 1524. In the present embodiment, die electromagnetic pulses are called the emitted signal, and propagate to an impulse radio receiver 1602, such as shown in FIG. 16, through a propagation medium, such as air, in a radio frequency embodiment. In a preferred embodiment, the emitted signal is wide-band or ultrawide-band, approaching a monocycle pulse.

However, the emitted signal can be spectrally modified by filtering of the pulses. This filtering will usually cause each monocycle pulse to have more zero crossings (more cycles) in the time domain. In this case, the impulse radio receiver can use a similar waveform as die template signal in the cross correlator for efficient conversion.

Receiver

FIG. 16 shows an exemplary embodiment of an impulse radio receiver 1602 (hereinafter called the receiver) for the impulse radio communication that may be used in connection with the present invention. More specifically, the system illustrated in FIG. 16 is for reception of digital data wherein one or more pulses are transmitted for each data bit.

The receiver 1602 comprises a receive antenna 1604 for receiving a propagated impulse radio signal 1607. A received signal 1608 from the receive antenna 1604 is coupled to a cross correlator or sampler 1610 to produce a baseband output 1612. The cross correlator or sampler 1610 includes multiply and integrate functions together with any necessary filters to optimize signal to noise ratio.

The receiver 1602 also includes a precision timing generator 1614, which receives a periodic timing signal 1617 from a receiver time base 1618. This time base 1618 is adjustable and controllable in time, frequency, or phase, as required by the lock loop in order to lock on the received signal 1608. The precision timing generator 1614 provides synchronizing signals 1620 to the code source 1622 and receives a code control signal 1624 from the code source 1622. The precision timing generator 1614 utilizes the periodic timing signal 1617 and code control signal 1624 to produce a coded timing signal 1627. The template generator 1628 is triggered by this coded timing signal 1627 and produces a train of template signal pulses 1630 ideally having waveforms substantially equivalent to each pulse of the received signal 1608. The code for receiving a given signal is the same code utilized by the originating transmitter 1502 to generate the propagated signal 1607. Thus, the timing of the template pulse train 1630 matches the timing of the received signal pulse train 1608, allowing die received signal 1608 to be synchronously sampled in the correlator 1610. The correlator 1610 ideally comprises a multiplier followed by a short-term integrator to sum the multiplier product over the pulse interval.

Further examples and details of correlation and sampling processes can be found in commonly owned U.S. Pat. No. 4,641,317, 4,743,906, 4,813,057, and 4979,186, which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference.

The output of the correlator 1610, also called a baseband signal 1612, is coupled to a subcarrier demodulator 1632, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 1632 is then filtered or integrated in a pulse summation stage 1634. The pulse summation stage produces an output representative of the sum of a number of pulse signals comprising a single data bit. The output of the pulse summation stage 1634 is then compared with a nominal zero (or reference) signal output in a detector stage 1638 to determine an output signal 1639 representing an estimate of the original information signal 1517.

The baseband signal 1612 is also input to a lowpass filter 1642 (also referred to as lock loop filter 1642). A control loop comprising the lowpass filter 1642, time base 1618, precision timing generator 1614, template generator 1628, and correlator 1610 is used to generate a filtered error signal 1644. The filtered error signal 1644 provides adjustments to the adjustable time base 1618 to time position the periodic timing signal 1627 in relation to the position of the received signal 1608.

In a transceiver embodiment, substantial economy can be achieved by sharing part or all of several of the functions of the transmitter 1502 and receiver 1602. Some of these include die time base 1618, precision timing generator 1614, code source 1622, antenna 1604, and the like.

What is claimed is:

1. A coding method for a pulse transmission system, comprising the steps of:
    specifying at least one of a temporal characteristic and a non-temporal pulse characteristic in accordance with at least one of a temporal characteristic value layout and a non-temporal characteristic value layout having one or more allowable and non-allowable regions;
    generating one or more codes having predefined properties; and
    generating a pulse train by mapping generated codes to the specified characteristic value layouts, wherein a code or a subset of a code satisfies predefined acceptance criteria.

2. The method of claim 1, wherein said code is a sequence of symbols.

3. The method of claim 1, wherein said code is a sequence of at least one of temporal and non-temporal characteristic values.

4. The method of claim 1, wherein said predefined criteria limit the number of temporal characteristic values or non-temporal characteristic values within at least one non-allowable region.

5. The method of claim 4, wherein said non-allowable region is relative to at least one characteristic value of at least one pulse.

6. The method of claim 1, wherein said predefined criteria corresponds to a spectral property.

7. The method of claim 6, wherein said spectral property limits the minimum spectral density at any frequency within a defined bandwidth.

8. The method of claim 6, wherein said spectral property limits the maximum spectral density at any frequency within a defined bandwidth.

9. The method of claim 6, wherein said spectral property limits the average spectral density at any frequency within a defined bandwidth.

10. The method of claim 1, wherein said predefined criteria corresponds to a correlation property.

11. The method of claim 10, wherein said correlation property limits the maximum number of pulse coincidences when correlated against an instance of itself that is offset in time.

12. The method of claim 10, wherein said correlation property limits the average number of pulse coincidences when correlated against an instance of itself that is offset in time.

13. The method of claim 10, wherein said correlation property limits the maximum ratio of pulse coincidences when correlated against an instance of itself that is offset in time to pulse coincidences when correlated against an instance of itself that is not offset in time.

14. The method of claim 10, wherein said correlation property limits the average ratio of pulse coincidences when correlated against an instance of itself that is offset in time to pulse coincidences when correlated against an instance of itself that is not offset in time.

15. The method of claim 10, wherein said correlation property limits the maximum number of pulse coincidences when correlated against another pulse train that is offset in time.

16. The method of claim 10, wherein said correlation property limits the average number of pulse coincidences when correlated against another pulse train that is or is not offset in time.

17. The method of claim 1, wherein said predefined criteria require the length of a code to be within a minimum length and a maximum length.

18. The method of claim 1, wherein said predefined criteria require a code family to have a minimum number of members.

19. An impulse transmission system comprising:
a Time Modulated Ultra Wideband Transmitter;
a Time Modulated Ultra Wideband Receiver; and
said Time Modulated Ultra Wideband Transmitter and said Time Modulated Ultra Wideband Receiver employ a code that specifies a temporal characteristic in accordance with a temporal characteristic value layout or a non-temporal pulse characteristic in accordance with a non-temporal characteristic value layout, or any combination thereof, wherein said temporal characteristic value layout and said non-temporal characteristic value layout have one or more allowable regions and one or more non-allowable regions, and said code or a subset of said code satisfies predefined acceptance criteria.

20. The impulse transmission system of claim 19, wherein said code is a sequence of symbols.

21. The impulse transmission system of claim 19, wherein said code is a sequence of temporal and/or non-temporal characteristic values.

22. The impulse transmission system of claim 19, wherein said predefined criteria limit the number of temporal characteristic values or non-temporal characteristic values within at least one non-allowable region.

23. The impulse transmission system of claim 22, wherein said non-allowable region is relative to at least one characteristic value of at least one pulse.

24. The impulse transmission system of claim 19, wherein said predefined criteria pertain to a spectral property.

25. The impulse transmission system of claim 24, wherein said spectral property limits the minimum spectral density at any frequency within some bandwidth of interest.

26. The impulse transmission system of claim 24, wherein said spectral property limits the maximum spectral density at any frequency within some bandwidth of interest.

27. The impulse transmission system of claim 24, wherein said spectral property limits the average spectral density at any frequency within some bandwidth of interest.

28. The impulse transmission system of claim 19, wherein said predefined criteria pertain to a correlation property.

29. The impulse transmission system of claim 28, wherein said correlation property limits the maximum number of pulse coincidences when correlated against an instance of itself that is offset in time.

30. The impulse transmission system of claim 28, wherein said correlation property limits the average number of pulse coincidences when correlated against an instance of itself that is offset in time.

31. The impulse transmission system of claim 28, wherein said correlation property limits the maximum ratio of pulse coincidences when correlated against an instance of itself that is offset in time to pulse coincidences when correlated against an instance of itself that is not offset in time.

32. The impulse transmission system of claim 28, wherein said correlation property limits the average ratio of pulse coincidences when correlated against an instance of itself that is offset in time to pulse coincidences when correlated against an instance of itself that is not offset in time.

33. The impulse transmission system of claim 28, wherein said correlation property limits the maximum number of pulse coincidences when correlated against another pulse train that is offset in time.

34. The impulse transmission system of claim 28, wherein said correlation property limits the average number of pulse coincidences when correlated against another pulse train that is or is not offset in time.

35. The impulse transmission system of claim 19, wherein said predefined criteria require the length of a code to be within a minimum length and a maximum length.

36. The impulse transmission system of claim 19, wherein said predefined criteria require a code family to have a minimum number of members.

* * * * *